United States Patent
Han et al.

(10) Patent No.: US 10,129,139 B2
(45) Date of Patent: Nov. 13, 2018

(54) METHOD AND APPARATUS FOR RELAYING IN MULTICAST NETWORK

(71) Applicants: Samsung Electronics Co., Ltd., Suwon-si (KR); SNU R&DB FOUNDATION, Seoul (KR)

(72) Inventors: Kwang Hoon Han, Suwon-si (KR); Sung Hyun Choi, Seoul (KR); Yeon Chul Shin, Busan (KR); Gyu Jin Lee, Seoul (KR); Kwang Taik Kim, Yongin-si (KR); Kyung Hun Jang, Suwon-si (KR); Jong Hoe Koo, Seoul (KR); Seung Kyu Baek, Seoul (KR)

(73) Assignees: Samsung Electronics Co., Ltd., Suwon-si (KR); SNU R&D Foundation, Seoul (KR)

( * ) Notice: Subject to any disclaimer, the term of this patent is extended or adjusted under 35 U.S.C. 154(b) by 471 days.

(21) Appl. No.: 14/667,989

(22) Filed: Mar. 25, 2015

(65) Prior Publication Data
US 2015/0372897 A1   Dec. 24, 2015

(30) Foreign Application Priority Data
Jun. 24, 2014 (KR) .................. 10-2014-0077343

(51) Int. Cl.
*H04L 12/721* (2013.01)
*H04L 12/70* (2013.01)
(Continued)

(52) U.S. Cl.
CPC .............. *H04L 45/26* (2013.01); *H04L 47/00* (2013.01); *H04L 43/0811* (2013.01); *H04L 43/0894* (2013.01); *H04W 84/12* (2013.01)

(58) Field of Classification Search
CPC ....... H04L 1/1827; H04L 45/10; H04L 1/022; H04L 12/1827; H04L 45/26; H04L 47/00; H04L 43/0811; H04L 43/0894; H04L 1/02
See application file for complete search history.

(56) References Cited

U.S. PATENT DOCUMENTS

| 2003/0118022 A1* | 6/2003 | Kulkarni | ............... H04L 47/10 370/392 |
|---|---|---|---|
| 2007/0086366 A1* | 4/2007 | Luo | .................... H04L 12/1827 370/260 |

(Continued)

FOREIGN PATENT DOCUMENTS

| EP | 2 501 083 A1 | 9/2012 |
|---|---|---|
| EP | 2 698 953 A1 | 2/2014 |
| EP | 2 871 908 A2 | 5/2015 |

OTHER PUBLICATIONS

Extended European Search Report issued in counterpart European Application No. 15172121.4 dated Feb. 9, 2016 (11 pages).

(Continued)

*Primary Examiner* — Michael Thier
*Assistant Examiner* — Prince A Mensah
(74) *Attorney, Agent, or Firm* — NSIP Law

(57) ABSTRACT

A source node includes a topology information extractor configured to acquire information of a channel state between nodes included in a multicast network, and extract topology information of the multicast network. The source node further includes a relay node selector configured to select, from the nodes, a relay node to relay a packet transmitted from the source node, based on the topology information.

22 Claims, 14 Drawing Sheets

(51) Int. Cl.
*H04W 84/12* (2009.01)
*H04L 12/26* (2006.01)

(56) References Cited

U.S. PATENT DOCUMENTS

| | | | |
|---|---|---|---|
| 2007/0147341 A1* | 6/2007 | Izumikawa | H04L 47/10 |
| | | | 370/351 |
| 2007/0223439 A1 | 9/2007 | Kosai | |
| 2008/0108369 A1* | 5/2008 | Visotsky | H04B 7/2606 |
| | | | 455/455 |
| 2009/0147746 A1 | 6/2009 | Alay et al. | |
| 2009/0201829 A1* | 8/2009 | Yamano | H04L 41/5009 |
| | | | 370/253 |
| 2012/0128009 A1* | 5/2012 | Yang | H03M 13/2906 |
| | | | 370/432 |
| 2012/0260144 A1* | 10/2012 | Varanasi | H04L 1/0057 |
| | | | 714/755 |
| 2014/0101116 A1* | 4/2014 | Alnafoosi | G06F 17/30153 |
| | | | 707/693 |
| 2014/0247797 A1* | 9/2014 | Monzen | H04L 1/0015 |
| | | | 370/329 |
| 2014/0281837 A1* | 9/2014 | Frigo | H04L 1/0041 |
| | | | 714/776 |
| 2014/0286220 A1* | 9/2014 | Folkmanis | H04L 12/1868 |
| | | | 370/312 |

OTHER PUBLICATIONS

Extended European Search Report dated Oct. 23, 2015, in counterpart European Application No. 15172121.4 (5 pages, in English).

\* cited by examiner

700

METHOD AND APPARATUS FOR RELAYING IN MULTICAST NETWORK

CROSS-REFERENCE TO RELATED APPLICATION

This application claims the benefit under 35 USC 119(a) of Korean Patent Application No. 10-2014-0077343, filed on Jun. 24, 2014, in the Korean Intellectual Property Office, the entire disclosure of which is incorporated herein by reference for all purposes.

BACKGROUND

1. Field

The following description relates to a method and apparatus for relaying in a multicast network.

2. Description of Related Art

In general, a communication system has been employed as a medium to connect a person and another person. Accordingly, only 1% of devices currently present on the earth are being used through mutual connection over a network. With the development in communication technology and unification movement according to integration of devices, smart phones, sensor devices, and a variety of devices having a communication function organize a large network. In addition, many users of communication terminals are more easily utilizing a variety of applications, such as content sharing, synchronization, output, and games, for example, through a direct connection between devices. To meet the requirements of a change in the market, wireless connection technologies capable of supporting a direct connection between devices, for example, a device-to-device communication beyond cellular communication using an existing infrastructure have appeared.

A multicast method and a unicast method differ in many aspects. Initially, the multicast method needs to provide a service to a large number of users and thus, may not easily determine whether the service has been accurately transferred since overhead according to the service transfer significantly increases according to an increase in the number of users. Also, many multicast/broadcast services need to be transferred in real time and are variable based on a time, a location, and other factors coming from characteristics of a wireless channel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a source node including a topology information extractor configured to acquire information of a channel state between nodes included in a multicast network, and extract topology information of the multicast network, and a relay node selector configured to select, from the nodes, a relay node to relay a packet transmitted from the source node, based on the topology information.

The topology information extractor may be configured to extract the topology information based on packets received by remaining nodes excluding the source node, among the nodes.

The topology information extractor may be configured to transmit training packets to a first node among remaining nodes excluding the source node, among the nodes, and receive, from the first node as feedback, a training report packet including information of the training packets received by the first node.

The topology information extractor may be configured to calculate a packet reception rate of the first node based on the training report packet, and select the first node as a relay candidate node in response to the packet reception rate being greater than or equal to a predetermined threshold level.

The topology information extractor may be configured to transmit, to a relay candidate node selected from remaining nodes excluding the source node, among the nodes, a training polling packet to cause the relay candidate node to transmit training packets to a second node among the remaining nodes.

In response to relay candidate nodes being present among the remaining nodes, the topology information extractor may be configured to transmit the training polling packet to the relay candidate nodes in a predetermined order.

The topology information extractor may be configured to receive, from the relay candidate node, a neighbor report packet including information of the second node and information of the training packets received by the second node.

The topology information extractor may be configured to receive, from the relay candidate node, a block training report packet including information of nodes that transmitted the training packets to a portion of the remaining nodes, information of the portion of the remaining nodes, and information of the training packets received by the portion of the remaining nodes.

The topology information extractor may be configured to select, as training nodes, a portion of remaining nodes excluding the source node, among the nodes, and extract the topology information based on information of packets received by the selected training nodes.

The topology information extractor may be configured to receive statistical information of the channel state between the nodes from remaining nodes excluding the source node, among the nodes, and extract the topology information based on the statistical information.

The relay node selector may be configured to classify remaining nodes excluding the source node, among the nodes, into a 1-hop node group and a 2-hop node group based on the topology information, and select the relay node from relay candidate nodes, among the remaining nodes, based on an effect of packet transmission from the relay candidate nodes with respect to at least a portion of the remaining nodes.

The relay node selector may be configured to estimate a predicted packet reception amount of each of the remaining nodes based on the topology information, the predicted packet reception amount indicating a packet reception amount that causes a probability that each of the remaining nodes receives packets corresponding to a target packet reception amount or more to be greater than or equal to a predetermined threshold probability, estimate a potentially required degree of freedom (PR-DoF) of each of the remaining nodes based on the predicted packet reception amount of each of the remaining nodes, the PR-DoF indicating an amount of packets to be additionally received by each of the remaining nodes after receiving a packet from another node, determine, to be in the 1-hop node group, a node having a relatively low PR-DoF, among the remaining nodes, and determine, to be in the 2-hop node group, a node having a relatively high PR-DoF, among the remaining nodes.

The relay node selector may be configured to calculate a number of required transmissions (RTX) of each of at least one node included in the 2-hop node group, based on the PR-DoF of each of the at least one node with respect to each of the relay candidate nodes, the RTX indicating an amount of packets that is requested to be transmitted by each of the at least one node with respect to each of the relay candidate nodes, and select the relay node from the relay candidate nodes based on the RTX.

The relay node selector may be configured to estimate a minimum RTX among the RTX of each of the at least one node included in the 2-hop node group, extract, from the at least one node with respect to each of the relay candidate nodes, a best two-hop node group (BTG) including nodes that request a corresponding relay candidate node to transmit a packet thereto at the minimum RTX, estimate, with respect to each of the relay candidate nodes, a maximum RTX among minimum RTXs of the nodes included in the BTG, and estimate, with respect to each of the relay candidate nodes, a first utility indicating an effect of packet transmission to the nodes included in the BTG according to the maximum RTX with respect to at least a portion of the remaining nodes.

The relay node selector may be configured to select, as the relay node, a relay candidate node having a largest first utility from the relay candidate nodes.

The relay node selector may be configured to select, as the relay node, a relay candidate node having a largest maximum RTX from the relay candidate nodes.

In response to a total packet transmission rate of the selected relay node being less than a predetermined maximum packet transmission amount, the relay node selector may be configured to select the relay node from the relay candidate nodes by updating the PR-DoF, the RTX, the minimum RTX, the maximum RTX, and the first utility, based on the selected relay node.

The relay node selector may be configured to estimate, with respect to each of the at least one node included in the 2-hop node group, a second utility indicating a satisfaction level of a node included in the 2-hop node group according to packet transmission from each of the relay candidate nodes to the node included in the 2-hop node group, estimate, with respect to each of the relay candidate nodes, a network utility indicating a satisfaction level of the 2-hop node group according to the packet transmission from each of the relay candidate nodes, based on the second utility of each of the at least one node, and select the relay node from the relay candidate nodes based on the network utility of each of the relay candidate nodes.

The relay node selector may be configured to select, from the relay candidate nodes as the relay node, a relay candidate node having a largest tilt of the second utility according to an amount of packets transmitted from one of the relay candidate nodes by updating the second utility of each of the relay candidate nodes in response to a tilt of the network utility according to an amount of packets transmitted from the relay candidate node.

In another general aspect, there is provided a node including an encoder configured to convert an original packet to an encoded packet based on a random matrix, and a decoder configured to convert the encoded packet to the original packet based on a generator matrix that is generated based on the encoded packet.

The encoder may be configured to generate encoded data by dividing the original packet into sub-packets, and performing an operation on the sub-packets and the random matrix.

The encoder may be configured to generate the encoded packet by adding, to the encoded data, a first header including information of the encoded data.

The first header may include at least one of information of a number of original packets, information of a length of the random matrix, information of an identifier of the encoded packet, information of a coefficient of the random matrix, and information of a type of the encoded packet.

The information of the type of the encoded packet may include a systematic code to transmit the original packet to a wireless local area network (WLAN) module prior to transmitting the encoded packet to the WLAN module, and a nonsystematic code to transmit the encoded packet to the WLAN module.

The encoder may be configured to add, to the encoded packet, a second header including information of an Ethernet type of the original packet.

In response to K original packets being received from an Ethernet module, the encoder may be configured to convert the K original packets to N encoded packets based on K random matrices, and transmit the N encoded packets to a wireless local area network (WLAN) module.

The decoder may be configured to extract the original packet by generating the generator matrix based on a matrix coefficient that is extracted from the encoded packet, and performing an operation on the encoded packet and an inverse matrix of the generator matrix.

The decoder may be configured to convert the encoded packet to the original packet based on an LU decomposition method.

The decoder may be configured to insert the encoded packet in a packet queue included in a packet queue list, and convert the encoded packet to the original packet in response to at least a predetermined number of encoded packets being inserted in the packet queue.

The packet queue may be connected to remaining packet queues included in the packet queue list and a linked list, and may include information of an identifier of the encoded packet inserted in the packet queue and a time at which the encoded packet is inserted in the packet queue.

In response to a time at which the encoded packet is inserted in the packet queue being ahead of a predetermined threshold time, the decoder may be configured to delete the packet queue from the packet queue list.

In response to an identifier of the encoded packet that is received from a wireless local area network (WLAN) module differing from an identifier of an encoded packet that is converted to an original packet during a predetermined period of time, the decoder may be configured to insert the encoded packet that is received from the WLAN module in the packet queue.

In response to an identifier of the encoded packet that is received from a wireless local area network (WLAN) module differing from identifiers of encoded packets that are inserted in packet queues included in the packet queue list, the decoder may be configured to insert the encoded packet that is received from the WLAN module in the packet queue.

In response to a component corresponding to the encoded packet in the generator matrix being linearly dependent, the decoder may be configured to delete the encoded packet from the packet queue.

In still another general aspect, there is provided a source node including a topology information extractor configured to acquire information of a channel state between nodes included in a multicast network, and extract topology information of the multicast network, a relay node selector configured to select, from the nodes, a relay node to relay a packet transmitted from the source node, based on the topology information, and a converter configured to convert an original packet to an encoded packet based on a random matrix, transmit and receive the encoded packet to and from the relay node, and convert the encoded packet to the original packet based on a generator matrix that is generated based on the received encoded packet.

In yet another general aspect, there is provided an operation method of a source node, the method including acquiring information of a channel state between nodes included in a multicast network, extracting topology information of the multicast network, and selecting, from the nodes, a relay node to relay a packet transmitted from the source node, based on the topology information.

In still another general aspect, there is provided an operation method of a node, the method including converting an original packet to an encoded packet based on a random matrix, and converting the encoded packet to the original packet based on a generator matrix that is generated based on the encoded packet.

In yet another general aspect, there is provided an operation method of a source node, the method including acquiring information of a channel state between nodes included in a multicast network, extracting topology information of the multicast network, selecting, from the nodes, a relay node to relay a packet transmitted from the source node, based on the topology information, converting an original packet to an encoded packet based on a random matrix, transmitting and receiving the encoded packet to and from the relay node, and converting the encoded packet to the original packet based on a generator matrix that is generated based on the received encoded packet.

A non-transitory computer-readable storage medium may store a program including instructions to cause a computer to perform the method.

Other features and aspects will be apparent from the following detailed description, the drawings, and the claims.

Figure 1:
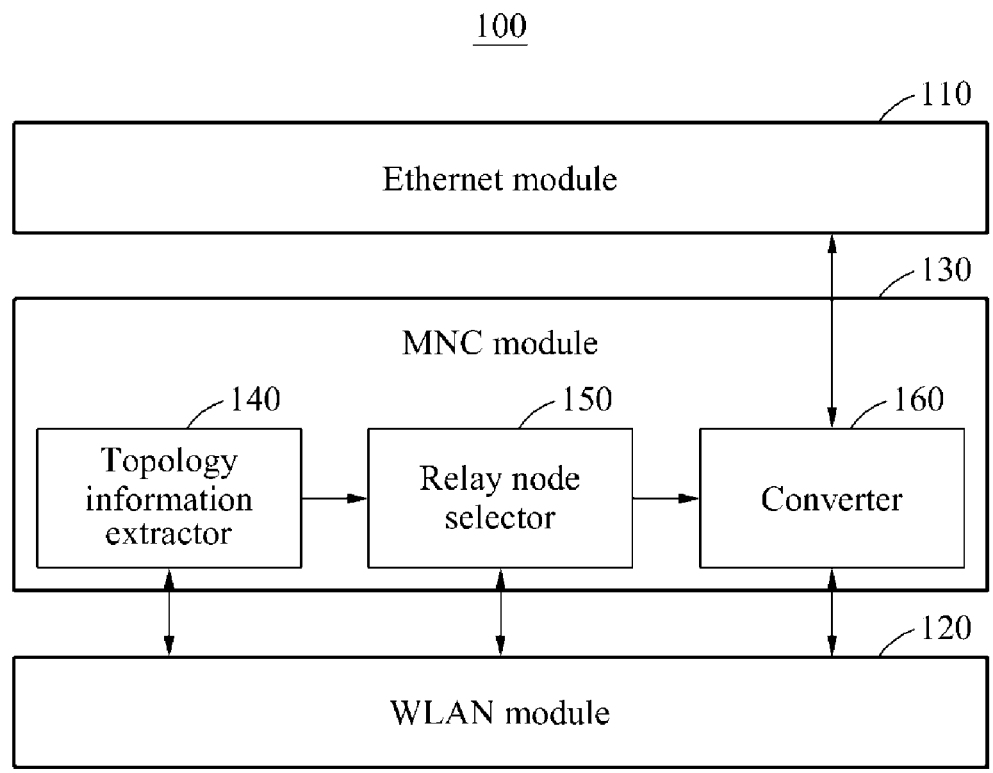
FIG. 1 is a diagram illustrating an example of a node in a multicast network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples will be described with reference to the accompanying drawings. Like reference numerals illustrated in the drawings refer to like constituent components.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Like reference numerals refer to like constituent components and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a node 100 in a multicast network. In an example, the multicast network may include a plurality of nodes. A source node may transmit a packet to the plurality of nodes in the multicast network. In this example, the source node may select a single relay node from among the plurality of nodes, and may transmit a packet to remaining nodes via the relay node. Accordingly, transmission coverage of the source node may be expanded, and a packet transmission efficiency of the source node may be enhanced.

Referring to FIG. 1, the node 100 includes an Ethernet module 110, a wireless local area network (WLAN) module 120, and a matrix network coding (MNC) module 130. The MNC module 130 is positioned between the Ethernet module 110 and the WLAN module 120. A location of the MNC module 130 is not limited to a location between the Ethernet module 110 and the WLAN module 120. For example, when the WLAN module 120 receives a packet from a layer 3 (L3) without using the Ethernet module 110, the MNC module 130 may be positioned above the WLAN module 120.

The MNC module 130 includes a topology information extractor 140, a relay node selector 150, and a converter 160. The topology information extractor 140 acquires information of a channel state between the plurality of nodes included in the multicast network, and extracts topology information of the multicast network. For example, the node 100 may transmit and receive a packet from and to other nodes included in the multicast network, and the topology information extractor 140 may acquire the packet transmitted and received from the WLAN module 120. The topology information extractor 140 extracts information of a channel state between the node 100 and each of other nodes based on the transmitted and received packet. Also, the topology information extractor 140 acquires, from the WLAN module 120, a packet transmitted and received between other nodes excluding the node 100. Accordingly, the topology information extractor 140 extracts topology information of the multicast network based on information of the channel state between the node 100 and each of the other nodes and information of the channel state between the other nodes excluding the node 100.

The relay node selector 150 selects, from the plurality of nodes included in the multicast network, a relay node to relay a packet transmitted from the node 100 based on the topology information. Also, the relay node selector 150 determines a packet transmission amount of the relay node. In an example, when the node 100 is not a source node, the node 100 may function as a relay node in response to a selection of the source node.

The converter 160 converts an original packet received from the Ethernet module 110 to an encoded packet using a random matrix, and transmits the encoded packet to the WLAN module 120. Accordingly, the encoded packet is transmitted to the relay node or another node. When the node 100 receives the encoded packet received from the relay node or the other node, the converter 160 receives the encoded packet from the WLAN module 120. The converter 160 converts the encoded packet to the original packet, using a generator matrix generated based on the encoded packet, and transmits the original packet to the Ethernet module 110. Accordingly, when the node 100 is a source node, the node 100 acquires topology information, selects the relay node from the plurality of nodes based on the topology information, and transmits the encoded packet to the relay node. In response thereto, the node 100 receives the encoded packet from the relay node, and decodes the encoded packet to the original packet. Conversely, when the node 100 is not a source node, the node 100 may be selected as the relay node under control of the source node. When the node 100 is selected as the relay node, the node 100 receives the encoded packet from the source node, and relays the encoded packet to the other node. When the node 100 is not selected as the relay node, the node 100 receives the encoded packet form the relay node, and decodes the encoded packet to the original packet.

Hereinafter, a topology information extraction method will be described.

Figure 2:
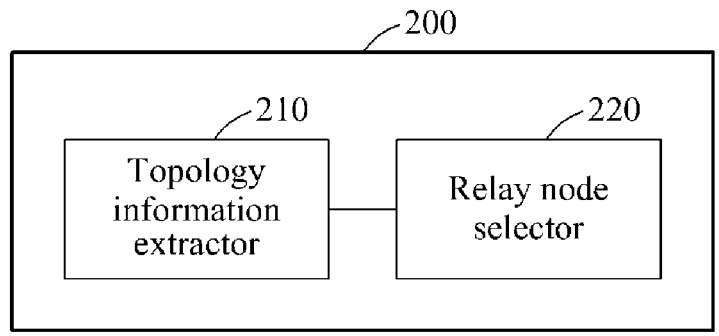
FIG. 2 is a diagram illustrating an example of a source node.

FIG. 2 illustrates an example of a source node 200. Referring to FIG. 2, the source node 200 includes a topology information extractor 210 and a relay node selector 220. In an example, the source node 200 may further include a converter (not shown). The converter of the source node 200 encodes an original packet to an encoded packet, using a random matrix, or decodes the encoded packet to the original packet, using a generator matrix generated based on the encoded packet.

The topology information extractor 210 extracts topology information based on information of packets received by remaining nodes excluding the source node 200, among a plurality of nodes included in a multicast network. The topology information extractor 210 acquires information of a channel state between the source node 200 and each of the remaining nodes, and information of a channel state between the remaining nodes, and estimates topology information based on the acquired information of the channel states.

In an example, the topology information extractor 210 transmits training packets to a neighbor node of the source node 200, and in response thereto, receives a training report packet as a feedback from the neighbor node. In this example, a neighbor node of a predetermined node may refer to a node relatively close to the predetermined node, or may also refer to all the nodes included in the multicast network. The term "training packet" refers to a packet transmitted from the topology information extractor 210 to a node of which a packet reception rate is to be measured, to measure the packet reception rate. The term "training report packet" refers to a packet used when a node having received a training packet reports to a node having transmitted the training packet about reception of the training packet. The training report packet includes information of training packets received by the neighbor node. For example, when the topology information extractor 210 transmits K training packets to a first node, the first node may receive (K−2) training packets based on a channel state between the source node 200 and the first node. In this example, the first node generates a training report packet including information of the number of received training packets, and transmits the generated training report packet to the topology information extractor 210.

Also, the topology information extractor 210 calculates a packet reception rate of the neighbor node having transmitted the training report packet, based on the training report packet. In an example, the topology information extractor 210 may select, as a relay candidate node, a node having a packet reception rate greater than or equal to a predetermined threshold level. For example, the topology information extractor 210 may extract, from a training report packet transmitted from the first node, information stating that the topology information extractor 210 has transmitted ten training packets to the first node, and the first node has received eight training packets. Accordingly, the topology information extractor 210 calculates a packet reception rate of the first node as 80%. In this example, when a predetermined threshold level is set as 70%, the topology information extractor 210 determines, as a relay candidate node, the first node having the packet reception rate greater than or equal to the predetermined threshold level.

Also, the topology information extractor 210 transmits a training polling packet to a relay candidate node. The term "training polling packet" refers to a packet causing a node having received a training polling packet to transmit training packets to a neighbor node of the node having received the training polling packet. Accordingly, the relay candidate node transmits the training packets to the neighbor node, and receives, from the neighbor node having received the training packets, a training report packet including information of the number of training packets received by the neighbor node. In response to receiving the training report packet, the relay candidate node generates a neighbor report packet, and transmits the neighbor report packet to the topology information extractor 210. The term "neighbor report packet" refers to a packet used to report to the source node 200 about a received training report packet when the relay candidate node transmits training packets to the neighbor node using a training polling packet and receives the training report packet from the neighbor node. A neighbor report field may include information of the neighbor node having transmitted the training report packet and information of training packets received by the neighbor node. For example, when the source node 200 and a second node are positioned at a relatively far distance, the topology information extractor 210 transmits a training polling packet to the first node relatively close to the source node 200. In response to the received training polling packet, the first node transmits training packets to the second node. The second node generates a training report packet including information of the number of received training packets, and transmits the training report packet to the first node. The first node generates a neighbor report packet including information of the second node and information of the training packets received by the second node, based on the received training report packet. The source node 200 receives the neighbor report packet from the first node, and calculates a packet reception rate of the second node with respect to the first node using the neighbor report packet.

In an example, a training packet transmitted by the source node 200 and a training packet transmitted by the relay candidate node may be distinguished from each other. For example, in the training packet transmitted by the source node 200, a field value of a type field may be "1". In the training packet transmitted by the relay candidate node, a field value of a type field may be "2". Also, a training report packet received by the topology information extractor 210 and a training report packet received by the relay candidate node may be distinguished from each other. For example, in the training report packet received by the topology information extractor 210, a field value of a type field may be "3". In the training report packet transmitted by the relay candidate node, a field value of a type field may be "4".

When a neighbor node of the source node 200 acquires training report packets from a plurality of other nodes, the topology information extractor 210 receives a block training report packet from a neighbor node of the source node 200. The term "block training report packet" refers to a packet to report to the source node 200 about received training report packets when a node excluding the source node 200 receives training report packets from the plurality of other nodes. The block training report packet includes information of nodes having transmitted the training packets to the plurality of other nodes, information of the plurality of other nodes, and information of the training packets received by the plurality of other nodes. For example, the topology information extractor 210 may transmit a training polling packet to the first node corresponding to a relay candidate node. In response to the received training polling packet, the first node may transmit training packets to the second node and a third node. The first node may receive a training report packet from each of the second node and the third node, and may generate a block training report packet using the received training report packets. In this example, the block raining report packet may include information of the first node, information of the second node and the third node, and information of the training packets received by the second node and the third node. The topology information extractor 210 receives the block training report packet from the first node, and estimates a channel state between the first node and each of the second node and the third node from the block training report packet.

In an example, the topology information extractor 210 may select, as training nodes, a portion of the plurality of nodes included in the multicast network, and may extract topology information based on information of packets periodically or aperiodically received by the selected training nodes while the plurality of nodes is transmitting and receiving general packets. Accordingly, the topology information extractor 210 may transmit and receive packets to and from a portion of the plurality nodes in order to extract topology information, which may lead to decreasing load of the multicast network.

In an example, while the topology information extractor 210 is transmitting and receiving general packets to and from the plurality of nodes included in the multicast node, the plurality of nodes may continuously monitor and update a channel state between the plurality of nodes, and may transmit statistical information of the channel state to the topology information extractor 210. The topology information extractor 210 extracts topology information based on information of the channel state between the plurality of nodes.

Figure 3:
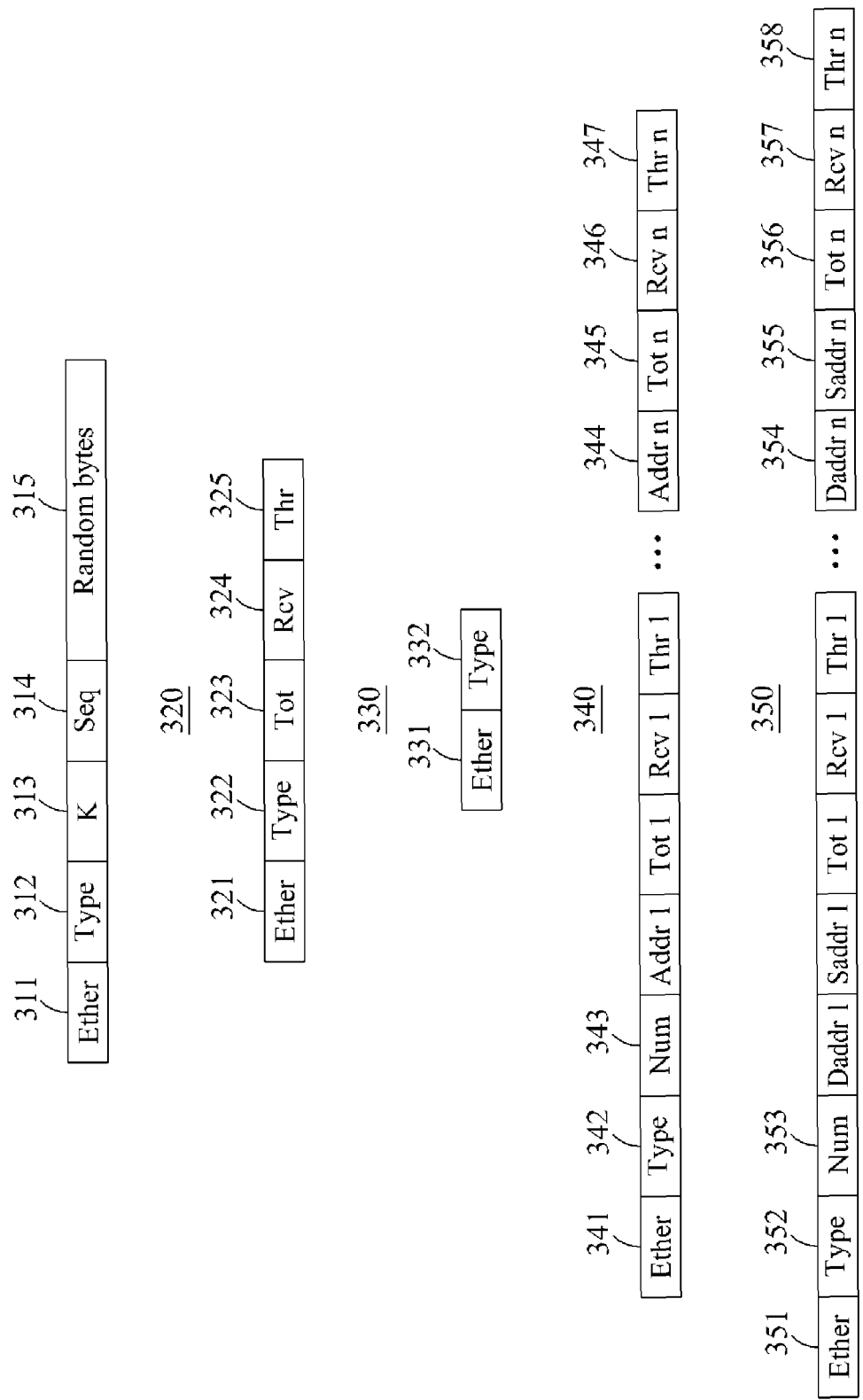
FIG. 3 is a diagram illustrating examples of formats of packets.

FIG. 3 illustrates examples of formats of packets. An operation of a source node to be described with reference to FIGS. 3 and 4 may refer to an operation of the topology information extractor 210 of FIG. 2.

Referring to FIG. 3, the source node acquires information of a channel state between a plurality of nodes included in a multicast network using a training packet 310, a training report packet 320, a training polling packet 330, a neighbor report packet 340, and a block training report packet 350.

The training packet 310 refers to a packet transmitted from the source node to a node of which a packet reception rate is to be measured, to measure the packet reception rate. The training packet 310 includes an Ethernet (Ether) header 311, a type field 312, a transmission amount (K) field 313, a sequence (seq) field 314, and a data (random bytes) field 315. The Ethernet header 311 indicates an Ethernet type of the training packet 310, and the type field 312 indicates an attribute of the training packet 310. For example, when a field value of the type field 312 is "1", the training packet 310 may refer to a training packet transmitted from the source node. When a field value of the type field 312 is "2", the training packet 310 may refer to a training packet transmitted from another node excluding the source node. The transmission amount field 313 indicates a total number of training packets transmitted from a node, and the sequence field 314 includes information of which numbered training packet the training packet 310 corresponds to among the training packets transmitted from the node. The data field 315 includes random data in a Galois field. In an example, the data field 315 may have the same length as a length of a packet substantially transmitted from and received by the node. For example, when the source node transmits and receives a packet of 1353 bytes to and from the first node, the source node may set the data field 315 to be 1353 bytes.

The training report packet 320 refers to a packet used when a node having received a training packet reports to a node having transmitted the training packet about reception of the training node. The training report packet 320 includes an Ethernet (Ether) header 321, a type field 322, a transmission amount (tot) field 323, a reception amount (rev) field 324, and a throughput (thr) field 325. The Ethernet header 321 indicates an Ethernet type of the training report packet 320, and the type field 322 indicates an attribute of the training report packet 320. For example, when a field value of the type field 322 is "3", the training report packet 320 may refer to a training report packet about a training packet transmitted from the source node. When a field value of the type field 322 is "4", the training report packet 320 may refer to a training report packet about a training packet transmitted from another node excluding the source node. The transmission amount field 323 indicates a total number of transmitted training packets, and the reception amount field 324 indicates the number of training packet substantially received by the node. The throughput field 325 indicates a throughput measured by the node having transmitted the training report packet 320.

The training polling packet 330 refers to a packet causing a node having received a training polling packet to transmit training packets to a neighbor node of the node having received the training polling packet. The training polling packet 330 includes an Ethernet (Ether) header 331 and a type field 332. The Ethernet header 331 indicates an Ethernet type of the training polling packet 330, and the type field 332 indicates an attribute of the training polling packet 330. In an example, a field value of the type field 332 of the training polling packet 330 may be "5".

The neighbor report packet 340 refers to a packet used to report to the source node about a received training report packet when a relay candidate node transmits training packets to a neighbor node using a training polling packet and receives the training report packet from the neighbor node. The neighbor report packet 340 includes an Ethernet (Ether) header 341, a type field 342, a report packet quantity (num) field 343, an address (addr n) field 344, a transmission amount (tot n) field 345, a reception amount (rev n) field 346, and a throughput (thr n) field 347. The Ethernet header 341 indicates an Ethernet type of the neighbor report packet 340, and the type field 342 indicates an attribute of the neighbor report packet 340. For example, a field value of the type field 342 may be "6". The report packet quantity field 343 indicates the number of training report packets reported using the neighbor report packet 340, the address field 344 indicates a media access control (MAC) address of a node corresponding to an n-th training report field, the transmission amount field 345 indicates the number of training packets transmitted to the node corresponding to the n-th training report field, and the reception amount field 346 indicates the number of training packets substantially received by the node corresponding to the n-th training report field. The throughput field 347 indicates a throughput measured by a node corresponding to each of the training report packets reported using the neighbor report packet 340.

The block training report packet 350 refers to a packet to report to the source node about received training report packets when a node excluding the source node receives the training report packets from other nodes. The block training report packet 350 includes an Ethernet (Ether) header 351, a type field 352, a report packet quantity (num) field 353, a destination address (daddr n) field 354, a source address (saddr n) field 355, a transmission amount (tot n) field 356, a reception amount (rev n) field 347, and a throughput (thr n) field 348.

The Ethernet header 351 indicates an Ethernet type of the block training report packet 350, and the type field 352 indicates an attribute of the block training report packet 350. For example, a field value of the type field 352 may be "7". The report packet quantity field 353 indicates the number of training report packets received by a node generating the block training report packet 350, the source address field 354 indicates an address of a node corresponding to an n-th training report field, the destination address field 355 indicates an address of a node having transmitted training packets to the node corresponding to the n-th training report field, the transmission amount field 356 indicates the number of training packets transmitted to the node corresponding to the n-th training report field, and the reception amount field 357 indicates the number of training packets substantially received by the node corresponding to the n-th training report field. The throughput field 358 indicates a throughput measured by a node corresponding to each of training report packets reported using the block training report packet 350.

Figure 4:
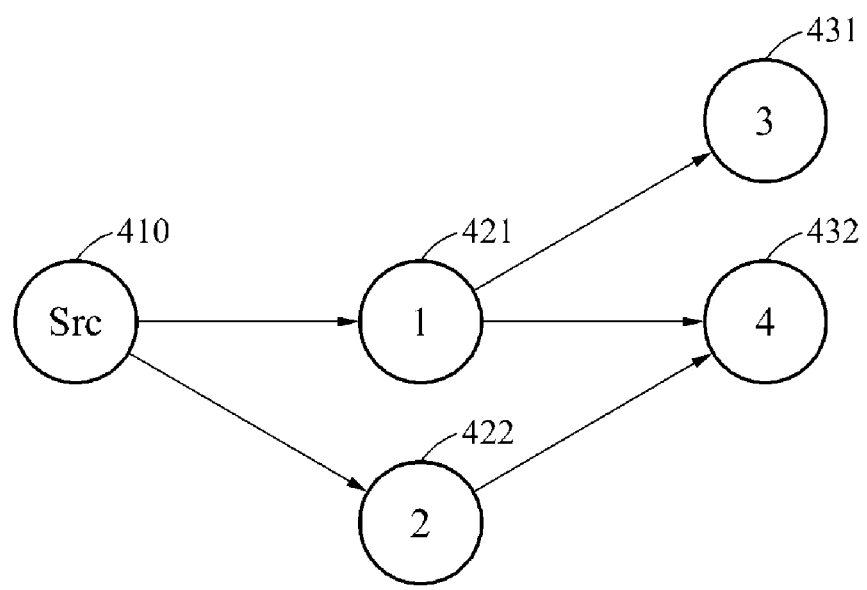
FIG. 4 is a diagram illustrating an example of an operation between a plurality of nodes.

FIG. 4 illustrates an example of an operation between a plurality of nodes. Referring to FIG. 4, a multicast network includes a source node 410, a first node 421, a second node 422, a third node 431, and a fourth node 432. In this example, the first node 421 and the second node 422 are 1-hop nodes configured to receive a packet from the source node 410, and the third node 431 and the fourth node 432 are 2-hop nodes configured to receive a packet from a 1-hop node.

The source node 410 extracts topology information at predetermined intervals, and also extracts topology information under control from an outside. The source node 410 may transmit training packets to the first node 421 and the second node 422 using a multicast method. Each of the first node 421 and the second node 422 calculates the number of received training packets, and in response thereto, transmits a training report packet to the source node 410 using a unicast method. Using the received training report packets, the source node 410 calculates packet reception rates of the first node 421 and the second node 422. When the packet reception rates of the first node 421 and the second node 422 are greater than or equal to a predetermined threshold level, the source node 410 selects the first node 421 and the second node 422 as relay candidate nodes.

If a predetermined period of time is elapsed after receiving a training report packet, the source node 410 initially transmits a training polling packet to the first node 421 between the first node 421 and the second node 422 corresponding to the relay candidate nodes. The source node 410 receives a neighbor report packet from the first node 421, and transmits the training polling packet to the second node 422. In an example, when the source node 410 does not receive a neighbor report packet from the first node 421 during a predetermined period of time, the source node 410 may request the first node 421 to retransmit the neighbor report packet. When the source node 410 does not receive the neighbor report packet from the first node 421 by a maximum number of retransmissions, the source node 410 transmits a training polling packet to the second node 422.

In response to the received training polling packet, the first node 421 transmits training packets to the third node 431 and the fourth node 432. The first node 421 receives a training report packet from each of the third node 431 and the fourth node 432. If a predetermined period of time is elapsed, the first node 421 generates a neighbor report packet based on the received training report packets, and transmits the generated neighbor report packet to the source node 410. In an example, when a channel state between the first node 421 and the source node 410 is poor, the first node 421 may generate a block training report packet based on the training report packets received from the third node 431 and the fourth node 432, may transmit the generated block training report packet to the second node 422. The second node 422 may transmit, to the source node 410, the block training report packet received from the first node 421. The source node 410 may extract topology information of the multicast network using training report packets, neighbor report packets, and/or block training report packets received from other nodes, for example, the first node 421, the second node 422, the third node 431, and the fourth node 432.

Hereinafter, a method of selecting a relay node will be described. Referring to FIG. 2, the relay node selector 220 selects a relay node from the plurality of nodes included in the multicast network, based on topology information extracted by the topology information extractor 210. The relay node refers to a node configured to receive a packet from the source node 200, and to relay the received packet to another node. The relay node selector 220 classifies, into a 1-hop node group and a 2-hop node group, remaining nodes excluding the source node 200, among the plurality of nodes based on the topology information, and selects a relay node from a plurality of relay candidate nodes based on effect of packet transmission from the plurality of relay candidate nodes with respect to at least a portion of the remaining nodes. An operation of the relay node selector 220 will be further described with reference to FIGS. 5 through 10. An operation of a source node to be described with reference to FIGS. 5 through 10 may refer to an operation of the relay node selector 220 of FIG. 2.

To describe examples of FIGS. 5 through 10, parameters employed for the relay node selector 220 are defined as follows:

(1) Predicted packet reception amount: The predicted packet reception amount indicates a packet reception amount of a reception node that causes a probability that the reception node receives packets corresponding to a target packet reception amount or more in an environment to be greater than or equal to a threshold probability in which a packet transmission success rate is constant. The reception node indicates a 2-hop node. When a packet transmission success rate of a transmission node is p, and a packet transmission of the transmission node and a packet transmission of another node are mutually independent, the probability that the reception node receives packets corresponding to the target packet reception rate is expressed by Equation 1.

$$P(X=k) = \binom{N}{k} p^k (1-p)^{N-k}$$ [Equation 1]

In Equation 1, X denotes the packet reception amount of the reception node, k denotes the target packet reception amount, N denotes the packet transmission amount of the transmission node, and p denotes the packet transmission success rate of the transmission node.

Also, the predicted packet reception amount, which is the packet reception amount of the reception node, causing the probability that the reception node receives packets corresponding to the target packet reception amount or more is expressed by Equation 2.

$$k^*(N, p, P_{th}) = \underset{k}{\operatorname{argmax}} P(X \geq k) \geq P_{th}$$ [Equation 2]

$$\text{when } P(X \geq k) = \sum_{i=k}^{N} P(X=i)$$

In Equation 2, N denotes the packet transmission amount of the transmission node, p denotes the packet transmission success rate of the transmission node, and $P_{th}$ denotes the threshold probability. X denotes the packet reception amount of the reception node, k denotes the target packet reception amount, and k* denotes the predicted packet reception amount.

Accordingly, when the packet transmission success rate is p and the transmission node transmits N packets, the predicted packet reception amount k*(N,p,$P_{th}$) indicates the packet reception amount of the reception node causing the probability that the reception node receives packets corresponding to the target packet reception amount or more to be greater than or equal to the threshold probability $P_{th}$. An operation of the predicted packet reception amount k*(N,p,$P_{th}$) may have relatively high calculation complexity. Accordingly, the predicted packet reception amount k*(N,p,$P_{th}$) may approximate a polynomial expression for the packet transmission amount N and the packet transmission success rate p.

In an example, when the threshold probability $P_{th}$=0.99, the predicted packet reception amount k*(N,p,$P_{th}$) may approximate an expression of a $Np^2$ with respect to an area in which the packet transmission amount N is "10" to "20" and the packet transmission success rate p is "0" to "1". For example, when a is set to "0.7656", the average error of a $Np^2$ may be "0.6". In an example, the predicted packet reception amount k*(N,p,$P_{th}$) may be calculated using a lookup table. For example, when the predicted packet reception amount k*(N,p,$P_{th}$) is calculated with respect to each of the packet transmission amount N, the packet transmission success rate p, and the threshold probability $P_{th}$, and is stored in a form of the lookup table, a node may extract the predicted packet reception amount k*(N,p,$P_{th}$) by referring to the lookup table.

(2) Potentially required degree of freedom (PR-DoF): The PR-DoF indicates an amount of packets to be additionally received by a reception node having received a packet from a transmission node. When a source node transmits a packet to a node i, a PR-DoF of the node i is expressed by Equation 3.

$$\text{Pr-DoF}_i = \max(K - k^*(N_z, p_{si}, P_{th}), 0)$$ [Equation 3]

In Equation 3, Pr-DoF$_i$ denotes the PR-DoF of the node i, K denotes the number of original packets when the source node converts an original packet to an encoded packet using a random matrix and transmits the encoded packet to the node i, and $N_z$ denotes the number of encoded packets transmitted from the source node to the node i. $p_{si}$ denotes a packet transmission success rate between the source node and the node i, and $P_{th}$ denotes the threshold probability. k* denotes a predicted packet reception amount of the node i. Equation 3 may be generalized as expressed by Equation 4.

$$\text{Pr-DoF}_{ij}(K_j', N_i, p_{ij}, P_{th}) = \max(K_j' - k^*(N_i, p_{ij}, P_{th}), 0) \quad \text{[Equation 4]}$$

In Equation 4, Pr-DoF$_{ij}$ denotes a PR-DoF of a reception node j with respect to a transmission node i, $K_j'$ denotes a previous PR-DoF of the reception node j, $N_i$ denotes the number of encoded packets transmitted from the transmission node i to the reception node j, $p_{ij}$ denotes a packet transmission success rate between the transmission node i and the reception node j, and $P_{th}$ denotes the threshold probability. k* denotes the predicted packet reception amount of the reception node j. Accordingly, a current PR-DoF of a node j indicates a value obtained by subtracting the predicted packet reception amount of the node j from the previous PR-DoF of the node j.

(3) Number of required transmissions (RTX): The RXT indicates an amount of packets that a node requests a relay candidate node to transmit. An RTX of the node i with respect to a relay candidate node j is expressed by Equation 5.

$$M_{ij} = \frac{Pr - DoF_{ij}(K_j', N_i, p_{ij}, P_{th})}{K^*(1, p_{ij}, P_{th})} \quad \text{[Equation 5]}$$

In Equation 5, $M_i$ denotes the RTX of the node i with respect to the relay candidate node j, Pr-DoF$_{ij}$ denotes a PR-DoF of the relay candidate node j with respect to the node i, $K_j'$ denotes a previous PR-DoF of the relay candidate node j, $N_i$ denotes the number of encoded packets transmitted from the node i to the relay candidate node j, $p_{ij}$ denotes a packet transmission success rate between the node i and the relay candidate node j, and $P_{th}$ denotes the threshold probability. k* denotes a predicted packet reception amount.

(4) Minimum RTX (mRTX): The minimum RTX indicates a smallest RTX among RTXs of a reception node with respect to a plurality of transmission nodes. The minimum RTX of the reception node j with respect to the relay candidate node i is expressed by Equation 6:

$$mRTXM_j' \quad \text{[Equation 6]}$$

In Equation 6, mRTXM$_j'$ denotes the minimum RTX of the reception node j.

(5) Best two-hop node group (BTG): The BTG indicates a group including a node that requests a corresponding relay candidate node for packet transmission at a minimum RTX among reception nodes. A BTG of a relay candidate node i is expressed by Equation 7.

$$BTG_i = \{j | M_j^* = M_{ij}\} \quad \text{[Equation 7]}$$

In Equation 7, BTG$_i$ denotes the BTG of the relay candidate node i, $M_j^*$ denotes a minimum RTX of a reception node j, and $M_{ij}$ denotes an RTX of the reception node j with respect to the relay candidate node i. Accordingly, the BTG of the relay candidate node i may be a group including a node of which a minimum RTX is associated with the relay candidate node i among the plurality of nodes.

(6) Maximum RTX (MmRTX): The maximum RTX indicates a largest minimum RTX among minimum RTXs of nodes included in a BTG. A maximum RTX of the relay candidate node i is expressed by Equation 8.

$$M_i' = \max\{M_j^* | j \in BTG_i\} \quad \text{[Equation 8]}$$

In Equation 8, $M_i'$ denotes the maximum RTX of the relay candidate node i, $M_j^*$ denotes the minimum RXT of the reception node j, and BTG$_i$ denotes the BTG of the relay candidate node i. In an example, the maximum RTX of the relay candidate node i may indicate an amount of packets to be transmitted to a node included in the BTG of the relay candidate node i.

(7) First utility: The first utility denotes effect of packet transmission to nodes included in a BTG according to a maximum RTX of a relay candidate node having with respect to neighbor nodes. The first utility of the relay candidate node i is expressed by Equation 9.

$$U_i = \sum_{j \in S} \min(k^*(M_i', p_{ij}, P_{th}), K_j') \quad \text{[Equation 9]}$$

In Equation 9, S denotes a set of reception nodes. Based on a state of the multicast network, the set S may indicate the BTG of the relay candidate node i and may also indicate the entire plurality of nodes included in the multicast network. $U_i$ denotes the first utility of the relay candidate node i, $K_j'$ denotes the previous PR-DoF of the reception node j, $p_{ij}$ denotes a packet transmission success rate between the relay candidate node i and the reception node j, and $P_{th}$ denotes the threshold probability. $M_i'$ denotes the maximum RTX of the relay candidate node i, and denotes the predicted packet reception amount of the reception node j. Accordingly, when the relay candidate node i retransmits $M_i'$ packets, the first utility according to Equation 9 indicates the number of packets transmittable to the plurality of nodes included in the multicast network.

Also, the first utility is expressed by Equation 10.

$$U_i = |BTG_i| \quad \text{[Equation 10]}$$

In Equation 10, $U_i$ denotes the first utility of the relay candidate node i, and BTG$_i$ denotes the BTG of the relay candidate node i. Accordingly, the first utility according to Equation 10 indicates the number of reception nodes to which the relay candidate node i may give satisfaction. In an example, when the first utility of the relay candidate node i according to Equation 10 is equal to the first utility of the relay candidate node j according to Equation 10, the source node determines, as a relay node, a relay candidate node having a smallest maximum RTX.

Also, the first utility is expressed by Equation 11.

$$U_i(S, K_j', N_i, p_{ij}, P_{th}) \quad \text{[Equation 11]}$$

In Equation 11, $U_i$ denotes the first utility of the relay candidate node i, S denotes a set of nodes included in the multicast network, $K_j'$ denotes the previous PR-DoF of the reception node j, $N_i$ denotes the number of encoded packets transmitted from the relay candidate node i to the reception node j, $p_{ij}$ denotes the packet transmission success rate between the relay candidate node i and the reception node j, and $P_{th}$ denotes the threshold probability.

Figure 5:
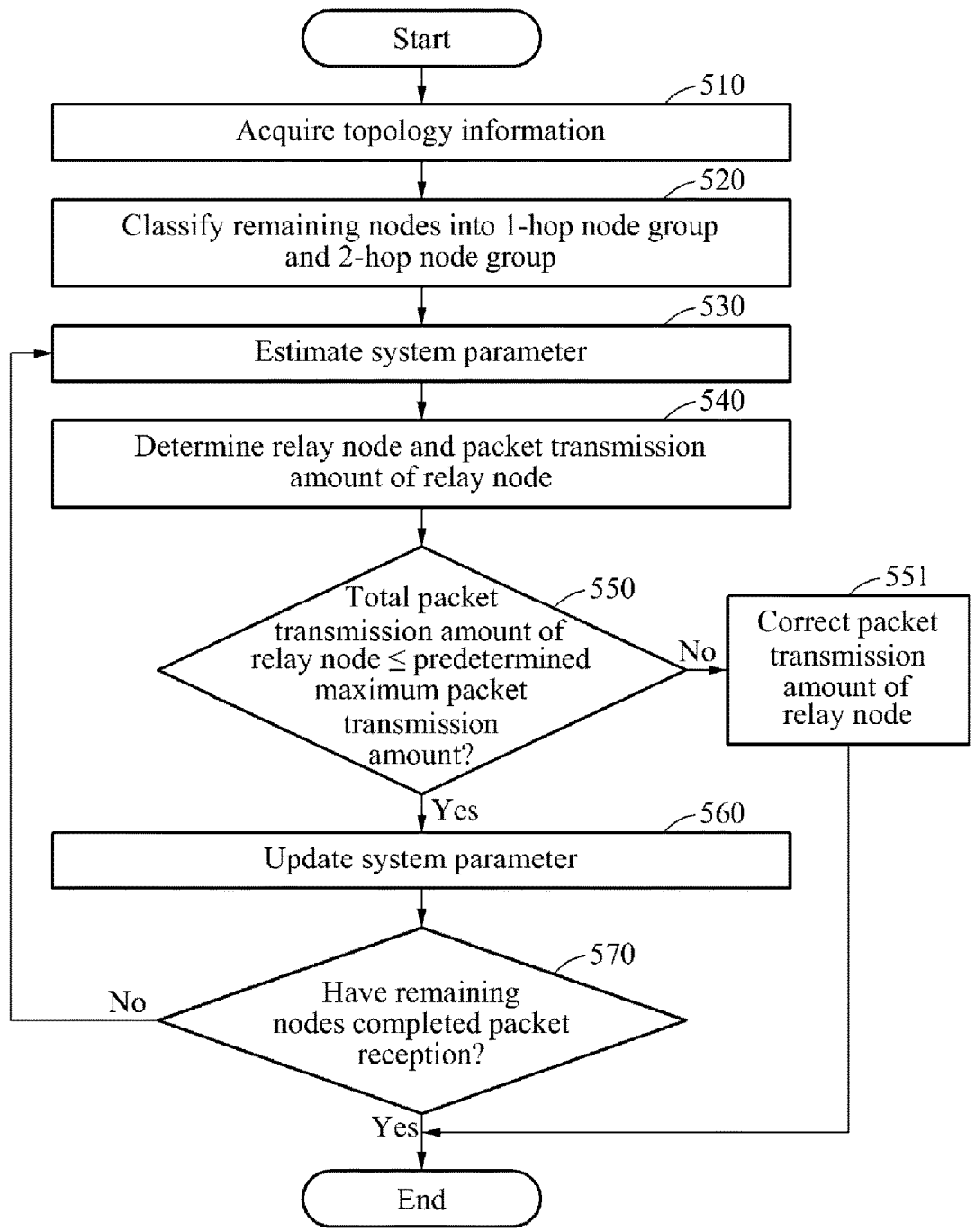
FIG. 5 is a flowchart illustrating an example of a method of selecting a relay node.

FIG. 5 is a flowchart illustrating an example of a method of selecting a relay node. Referring to FIG. 5, in operation 510, a source node acquires topology information. The source node acquires information of a channel state between a plurality of nodes included in a multicast network, and extracts the topology information of the multicast network from the information of the channel state.

In operation 520, the source node classifies, into a 1-hop node group and a 2-hop node group, remaining nodes excluding the source node, among the plurality of nodes included in the multicast network. The 1-hop node group denotes a group of nodes configured to receive a packet from the source node, and the 2-hop node group denotes a group of nodes configured to receive a packet transmitted from the source node through a relay of a 1-hop node. According to Equation 2, the source node estimates a predicted packet reception amount of each of the remaining nodes based on the topology information. The predicted packet reception amount indicates a packet reception amount of each of the remaining nodes causing a probability that each of the remaining nodes receives packets corresponding to a target packet reception amount or more to be greater than or equal to a predetermined threshold probability. According to Equation 3, the source node estimates a PR-DoF of each of the remaining nodes based on the predicted packet reception amount of each of the remaining nodes. The PR-DoF indicates an amount of packets to be additionally received by each of the remaining nodes after receiving a packet from another node. The source node may determine a node having a relatively low PR-DoF as the 1-hop node group, and may determine a node having a relatively high PR-DoF as the 2-hop node group. For example, the source node may determine a node having a PR-DoF of "0" as the 1-hop node group, and may determine a node having a PR-DoF greater than "0" as the 2-hop node group.

In operation 530, the source node estimates a system parameter. The system parameter may include, for example, an RTX, a minimum RTX, a maximum RTX, and/or a first utility.

In an example, the source node may calculate an RTX of each of at least one node included in the 2-hop node group. To this end, according to Equation 4, the source node calculates, with respect to each of the plurality of relay candidate nodes, a PR-DoF of each of at least one node included in the 2-hop node group. According to Equation 5, the source node calculates, with respect to each of the plurality of relay candidate nodes, an RTX of each of the at least one node included in the 2-hop node group, based on the PR-DoF of each of the at least one node included in the 2-hop node group with respect to each of the plurality of relay candidate nodes.

In an example, according to Equation 6, the source node may estimate a minimum RTX indicating a smallest RTX among RTXs of the at least one node included in the 2-hop node group, with respect to each of the at least one node included in the 2-hop node group.

In an example, according to Equation 7, the source node may extract, with respect to each of the plurality of relay candidate nodes, a BTG including a node that requests a corresponding relay candidate node for packet transmission at a minimum RTX among the at least one node included in the 2-hop node group.

In an example, according to Equation 8, the source node may estimate, with respect to each of the plurality of relay candidate nodes, a maximum RTX indicating a largest minimum RTX among minimum RTXs of nodes included in a BTG.

In an example, according to at least one of Equation 9, Equation 10, and Equation 11, the source node may estimate the first utility of each of the plurality of relay candidate nodes. The first utility denotes an effect of packet transmission to nodes included in a BTG according to a maximum RTX of each of the plurality of relay candidate nodes having with respect to at least a portion of the remaining nodes.

In operation 540, the source node determines a relay node and a packet transmission amount of the relay node. In an example, the source node may select, from the plurality of relay candidate nodes as the relay node, a relay candidate node having a largest first utility, and may determine a packet transmission amount of the selected relay node. In an example, the source node may select, from the plurality of relay candidate nodes as the relay node, a relay candidate node having a largest maximum RTX, and may determine a packet transmission amount of the selected relay node.

In operation 550, the source node determines whether a total packet transmission amount of the relay node is less than or equal to a predetermined maximum packet transmission amount. When the total packet transmission amount of the relay node is greater than the predetermined maximum packet transmission amount, the source node continues in operation 551. When the total packet transmission amount of the relay node is less than or equal to the predetermined maximum packet transmission amount, the source node continues in operation 560.

In operation 551, the source node corrects the packet transmission amount of the relay node to be less than or equal to the predetermined maximum packet transmission amount.

In operation 560, the source node updates a system parameter. In an example, the source node may update the PR-DoF, the RTX, the minimum RTX, the maximum RTX, and/or the first utility based on the relay node.

In operation 570, the source node determines whether the remaining nodes have completed a packet reception. When the remaining nodes have not completed the packet reception, the source node repeats operations 530 through 570. Conversely, when the remaining nodes have completed the packet reception, the source node enters into an idle state.

Figure 6:
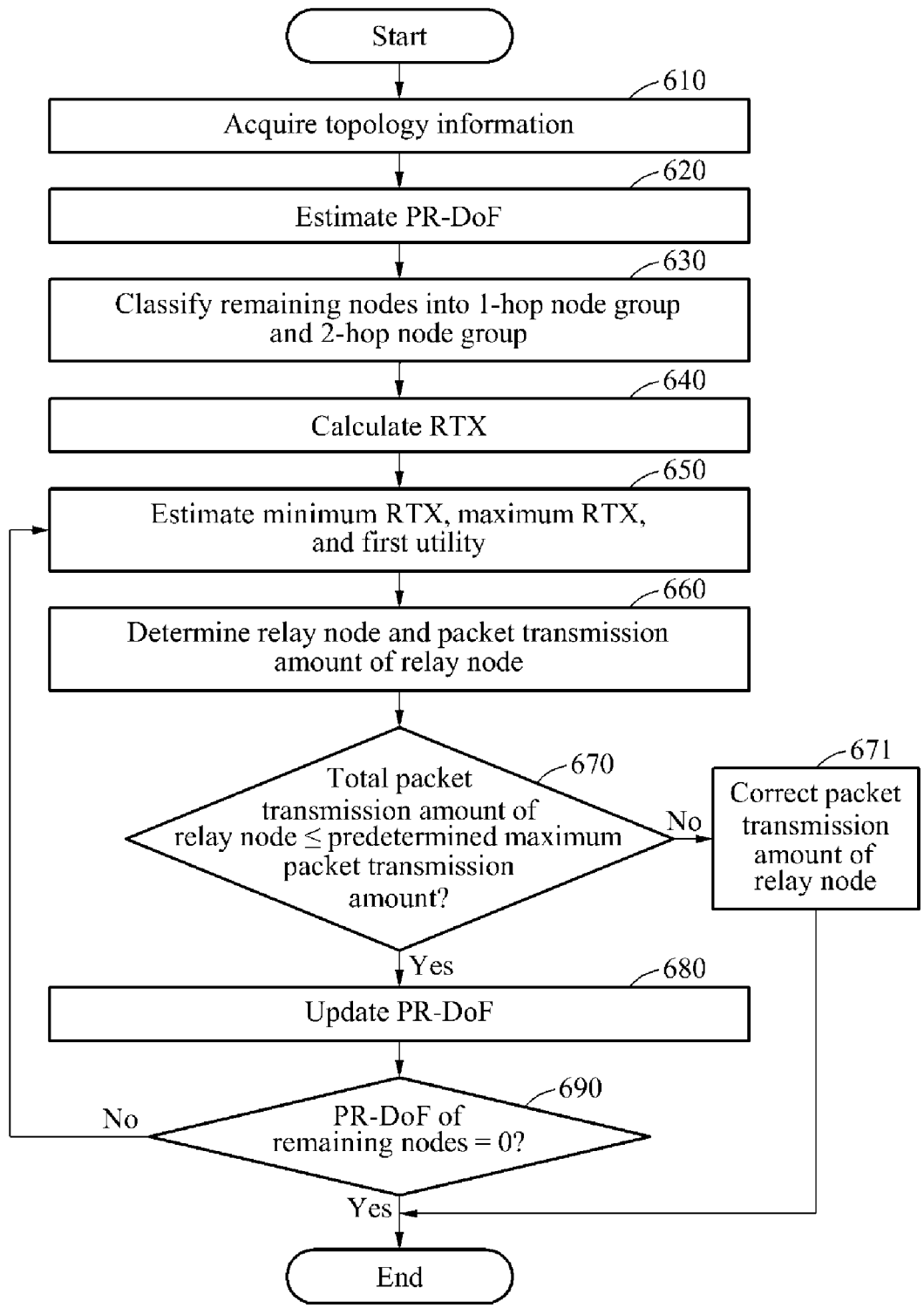
FIG. 6 is a flowchart illustrating another example of a method of selecting a relay node.

FIG. 6 is a flowchart illustrating another example of a method of selecting a relay node. Referring to FIG. 6, in operation 610, a source node acquires topology information. The source node acquires information of a channel state between a plurality of nodes included in a multicast network, and extracts topology information of the multicast network from on the information of the channel state.

In operation 620, the source node estimates a PR-DoF of each of remaining nodes excluding the source node, among the plurality of nodes included in the multicast network. The PR-DoF indicates an amount of packets to be additionally received by each of the remaining nodes after receiving a packet from another node. The source node may predict a predicted packet reception amount of each of the remaining nodes according to Equation 2, and may estimate a PR-DoF of each of the remaining nodes based on the predicted packet reception amount of each of the remaining nodes according to Equation 3.

In operation 630, the source node classifies the remaining nodes into a 1-hop node group and a 2-hop node group. The source node may determine a node having a relatively low PR-DoF as the 1-hop node group, and may determine a node having a relatively high PR-DoF as the 2-hop node group. For example, the source node may determine a node having a PR-DoF of "0" as the 1-hop node group, and may determine a node having a PR-DoF greater than "0" as the 2-hop node group.

In operation 640, the source node calculates an RTX of each of at least one node included in the 2-hop node group. According to Equation 5, the source node calculates, with respect to each of the plurality of relay candidate nodes, an RTX of each of the at least one node included in the 2-hop node group, based on the PR-DoF of each of the at least one node included in the 2-hop node group with respect to each of the plurality of relay candidate nodes.

In operation 650, the source node estimates a minimum RTX, a maximum RTX, and a first utility. According to Equation 6, the source node estimates a minimum RTX of each of the at least one node included in the 2-hop node group. Also, the source node extracts a BTG of each of the plurality of relay candidate nodes according to Equation 7, and estimates a maximum RTX of each of the plurality of relay candidate nodes according to Equation 8. Also, the source node estimates the first utility of each of the plurality of relay candidate nodes, according to at least one of Equation 9, Equation 10, and Equation 11.

In operation 660, the source node determines a relay node and a packet transmission amount of the relay node. In an example, when the first utility is estimated with respect to each of the plurality of relay candidate nodes according to Equation 9 or Equation 10, the source node may select, from the plurality of relay candidate nodes as the relay node, a relay candidate node having a largest first utility, and may determine a maximum RTX of the selected relay node as a packet transmission amount of the relay node. In an example, the source node may select, from the plurality of relay candidate node as the relay node, a relay candidate node having a largest maximum RTX, and may determine the maximum RTX of the selected relay node as a packet transmission amount of the relay node.

In operation 670, the source node determines whether a total packet transmission amount of the relay node is less than or equal to a predetermined maximum packet transmission amount. In an example, the predetermined maximum packet transmission amount may be set based on a throughput measured by the relay node. When the total packet transmission amount of the relay node is greater than the predetermined maximum packet transmission amount, the source node continues in operation 671. When the total packet transmission amount of the relay node is less than or equal to the predetermined maximum packet transmission amount, the source node continues in operation 680.

In operation 671, the source node corrects the packet transmission amount of the relay node to be less than or equal to the predetermined maximum packet transmission amount.

In operation 680, the source node updates a PR-DoF of each of the remaining nodes.

In operation 690, the source node determines whether the PR-DoF of each of the remaining nodes=0. When a node having a PR-DOF greater than "0" is present among the remaining nodes, the source node repeats operations 650 through 690. Conversely, when the PR-DoF=0, the source node enters into an idle state. In an example, when the number of packets to be transmitted to a plurality of nodes included in the multicast network is greater than or equal to a predetermined threshold, the source node enters in an idle state.

Figure 7:
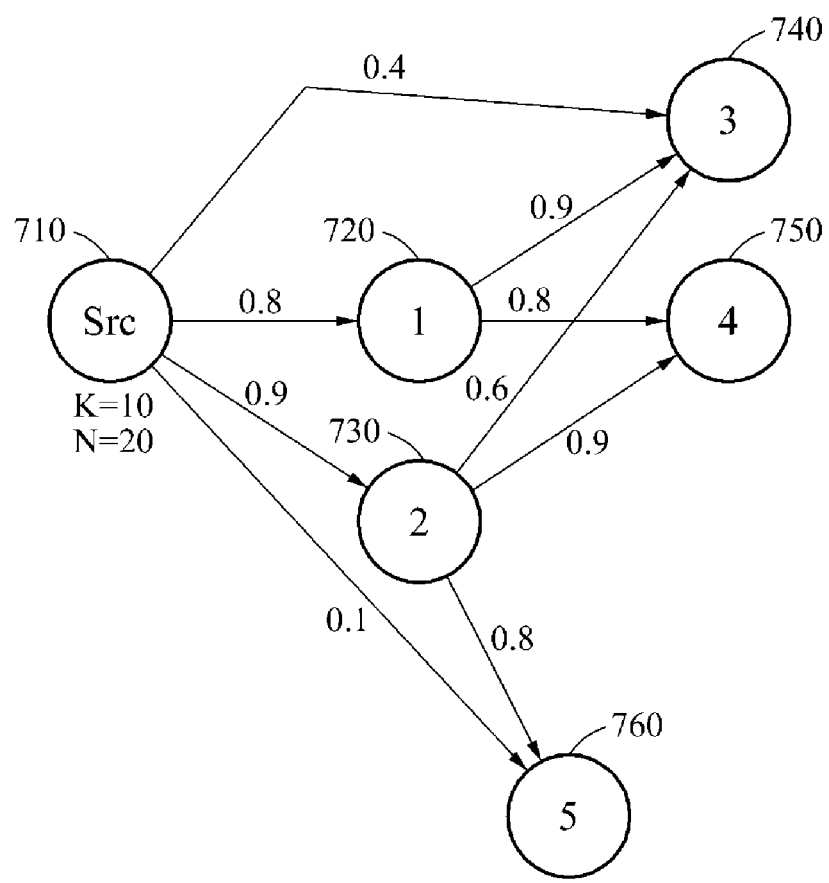
FIG. 7 is a diagram illustrating an example of selecting a relay node.

FIG. 7 illustrates an example of selecting a relay node. Referring to FIG. 7, the multicast network 700 includes a plurality of nodes, for example, a source node 710, a first node 720, a second node 730, a third node 740, a fourth node 750, and a fifth node 760. In the example of FIG. 7, a number on each line connecting nodes indicates a packet transmission success rate of a transmission node between the nodes connected by each line. The source node 710 acquires topology information of the plurality of nodes. The source node 710 extracts information of a packet transmission success rate between the plurality of nodes based on the topology information. The source node 710 encodes ten original packets (K=10) to twenty encoded packets (N=20), and transmits the twenty encoded packets to each node.

The source node 710 estimates a predicted packet transmission amount of each of remaining nodes, for example, the first through fifth nodes 720, 730, 740, 750, and 760, by approximating Equation 2. In this example, a may be set to "0.8". Also, the source node 710 estimates a PR-DoF of each of the remaining nodes, for example, the first through fifth nodes 720, 730, 740, 750, and 760, according to Equation 3. In this example, the PR-DoFs of the first node 720 and the second node 730 may be estimated as "0". The PR-DoF of the third node 740 may be estimated as "8", the PR-DoF of the fourth node 750 may be estimated as "10", and the PR-DoF of the fifth node 760 may be estimated as "10". Accordingly, the source node 710 classifies, into a 1-hop node group, the first node 720 and the second node 730 having the PR-DoF of "0", and classifies, into a 2-hop node group, the third node 740, fourth node 750, and the fifth node 760 having the PR-DoF greater than "0".

According to Equation 5, the source node 710 estimates an RTX of each of nodes, for example, the third node 740, the fourth node 750, and the fifth node 760 included in the 2-hop node group. In this example, RTX $M_{13}$ of the third node 740 with respect to the first node 720 may be estimated as "13", and RTX $M_{23}$ of the third node 740 with respect to the second node 730 may be estimated as "28". RTX $M_{14}$ of the fourth node 750 with respect to the first node 720 may be estimated as "20", RTX $M_{24}$ of the fourth node 750 with respect to the second node 730 may be estimated as "16", and RTX $M_{25}$ of the fifth node 760 with respect to the second node 730 may be estimated as "20".

According to Equation 6, the source node estimates minimum RTX $M_3^*$ of the third node 740 as "13" that is RTX $M_{13}$ of the third node 740 with respect to the first node 720, estimates minimum RTX $M_4^*$ of the fourth node 750 as "16" that is RTX $M_{24}$ of the fourth node 750 with respect to the second node 730, and estimates minimum RTX $M_5^*$ of the fifth node 760 as "20" that is RTX $M_{25}$ of the fifth node 760 with respect to the second node 730.

The source node 710 includes the third node 740 in a BTG of the first node 720, based on Equation 7, and estimates maximum RTX $M_1'$ of the first node 720 as "13" that is RTX $M_{13}$ of the third node 740 with respect to the first node 720 according to Equation 8. Also, the source node 710 includes the fourth node 750 and the fifth node 760 in a BTG of the second node 730, based on Equation 7, and estimates maximum RTX $M_2'$ of the second node 730 as "20" that is RTX $M_{25}$ of the fifth node 760 with respect to the second node 730 according to Equation 8.

According to Equation 9, the source node estimates first utility $U_l$ of the first node 720 as "14", and estimates first utility $U_2$ of the second node 730 as "25". In an example, the first utility $U_2$ of the second node 730 is greater than the first utility $U_l$ of the first node 720, and thus, the source node 710 may determine the second node 730 as a relay node, and may determine a packet transmission amount of the second node 730 to be "20" that is maximum RTX $M_2'$ of the second node 730.

When the packet transmission amount of the second node 730 corresponding to the relay node is determined to be less than a predetermined maximum packet transmission amount, the source node 710 updates PR-DoFs of the remaining nodes, for example, the first node 720, the second node 730, the third node 740, fourth node 750, and the fifth node 760, using Equation 3. In this example, the PR-DoFs of the first node 720, the second node 730, the fourth node 750, and the fifth node 760 may be estimated as "0", and the PR-DoF of the third node 740 may be estimated as "3". Accordingly, the source node 710 classifies, into the 1-hop node group, the first node 720, the second node 730, the fourth node 750, and the fifth node 760 having the PR-DoF of "0", and classifies, into the 2-hop node group, the third node 740 having the PR-DoF greater than "0".

According to Equation 5, the source node 710 estimates an RTX of the third node 740 included in the 2-hop node group. In this example, RTX $M_{13}$ of the third node 740 with respect to the first node 720 may be estimated as "5". Also, according to Equation 6, the source node 710 estimates minimum RTX $M_3^*$ of the third node 740 as "5" that is RTX $M_{13}$ of the third node 740 with respect to the first node 720. The source node 710 includes the third node 740 in the BTG of the first node 720 based on Equation 7, and estimates maximum RTX $M_1'$ of the first node 720 as "5" that is RTX $M_{13}$ of the third node 740 with respect to the first node 720 according to Equation 8.

According to Equation 9, the source node 710 estimates first utility $U_1$ of the first node 720 as "3", and determines the first node 720 as a relay node. Also, the source node 710 determines a packet transmission amount of the first node 720 to be "3" that is maximum RTX $M_1$ of the first node 720. When the packet transmission amount of the first node 720 corresponding to the relay node is determined to be less than a predetermined maximum packet transmission amount, the source node 710 updates PR-DoFs of the remaining nodes, for example, the first node 720, the second node 730, the third node 740, fourth node 750, and the fifth node 760, using Equation 3. When the PR-DoFs of the remaining nodes are "0" as a result of the updating, the source node 710 enters into an idle state.

Figure 8A:
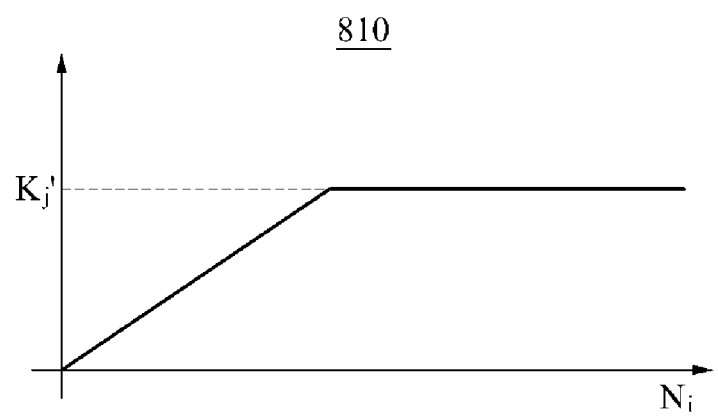
FIGS. 8A and 8B are graphs describing an example of a network utility.
Figure 8B:
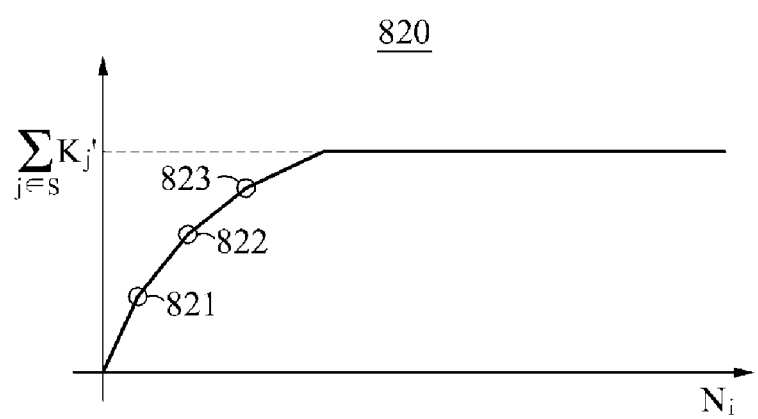

FIGS. 8A and 8B illustrate graphs 810 and 820 describing an example of a network utility. Referring to FIG. 8A, the graph 810 shows a tilt of a second utility of a reception node j according to an amount of packets transmitted from a relay candidate node i. The second utility of the reception node j indicates a satisfaction level of the reception node j according to packet transmission from the relay candidate node i to the reception node j. Also, the reception node j may be included in a 2-hop node group. The second utility of the reception node j according to the packet transmission from the relay candidate node i to the reception node j is expressed by Equation 12.

$$U_{ij} = \min(k^*(N_i, p_{ij}, P_{th}), K_j') \qquad \text{[Equation 12]}$$

In Equation 12, $U_{ij}$ denotes the second utility of the reception node j according to the packet transmission from the relay candidate node i to the reception node j, $k^*$ denotes a predicted packet reception amount of the reception node j, $K_j'$ denotes a previous PR-DoF of the reception node j, $N_i$ denotes the number of encoded packet transmitted from the relay candidate node i to the reception node j, $p_{ij}$ denotes a packet transmission success rate between the relay candidate node i and the reception node j, and $P_{th}$ denotes the threshold probability. In an example, the second utility of the reception node j may be converged to the previous PR-DoF $K_j'$ of the reception node j.

Referring to FIG. 8B, the graph 820 shows a tilt of a network utility of the relay candidate node i according to an amount of packets transmitted from the relay candidate node i. The network utility of the relay candidate node i indicates a satisfaction level of a 2-hop node group according to the packet transmission of the relay candidate node i. The network utility of the relay candidate node i is expressed by Equation 13.

$$U_i = \sum_{j \in S} U_{ij} \qquad \text{[Equation 13]}$$

In Equation 13, $U_i$ denotes the network utility of the relay candidate node i, $U_{ij}$ denotes the second utility of the reception node j according to the packet transmission from the relay candidate node i to the reception node j, and S denotes a set of reception nodes. The set S may be variable based on a state of the multicast network. A maximum sum of the second utility $U_{ij}$ of the reception node j belonging to the set S may converge on a predetermined value. For example, a sum of the second utility $U_{ij}$ of the reception node j belonging to the set S may converge on $$\sum_{j \in S} K_j'$$

that is a sum of the previous PR-DoF $K_j'$ of the reception node j. In an example, as indicated at inflection points 821, 822, and 823 of the graph 820, every time the tilt of the network utility of the relay candidate node i according to an amount of packets transmitted from the relay candidate node i varies, the source node may select a new relay node, and may determine a packet transmission amount of the selected relay node.

Figure 9:
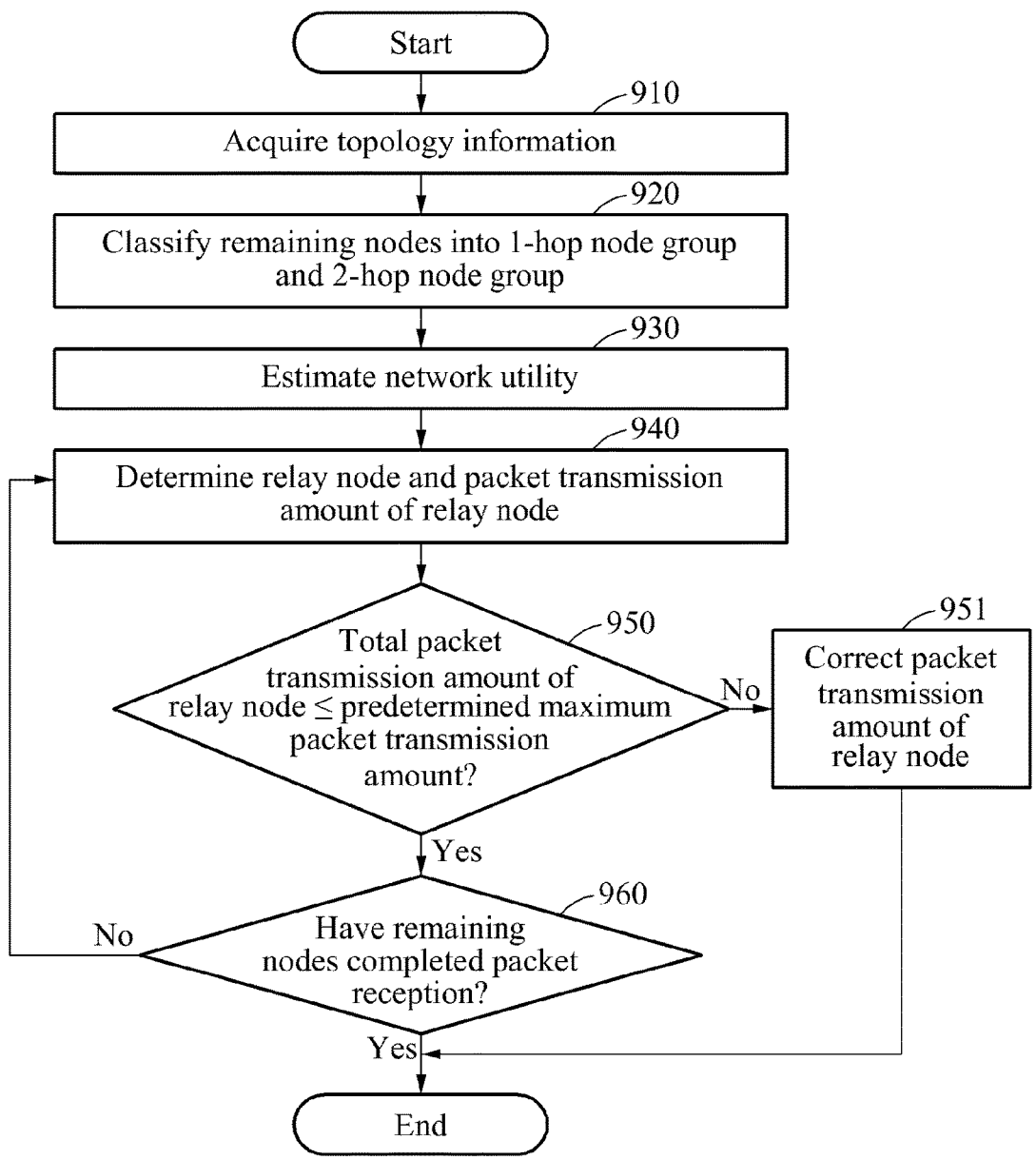
FIG. 9 is a flowchart illustrating still another example of a method of selecting a relay node.

FIG. 9 is a flowchart illustrating still another example of a method of selecting a relay node. Referring to FIG. 9, in operation 910, a source node acquires topology information. The source node acquires information of a channel state between a plurality of nodes included in a multicast network, and extracts topology information of the multicast network from the information of the channel state.

In operation 920, the source node classifies, into a 1-hop node group and a 2-hop node group, remaining nodes excluding the source node, among the plurality of nodes included in the multicast network. According to Equation 2, the source node estimates a predicted packet reception amount of each of the remaining nodes based on the topology information. According to Equation 3, the source node estimates a PR-DoF of each of the remaining nodes based on the predicted packet reception amount of each of the remaining nodes. The source node may determine a node having a relatively low PR-DoF as the 1-hop node group, and may determine a node having a relatively high PR-DoF as the 2-hop node group.

In operation 930, the source node estimates a network utility of each of the plurality of relay candidate nodes. According to Equation 12, the source node estimates, with respect to each node included in the 2-hop node group, the second utility indicating a satisfaction level of a node included in the 2-hop node group according to packet transmission from each of the plurality of relay candidate nodes to the node included in the 2-hop node group. According to Equation 13, the source node estimates the network utility with respect to each of the plurality of relay candidate nodes.

In operation 940, the source node determines a relay node and a packet transmission amount of the relay node. When transmitting packets to the remaining nodes excluding the source node, among the plurality of nodes included in the multicast network, the source node estimates a network utility of the source node according to Equation 13, and extracts a tilt of the network utility of the source node according to an amount of packets transmitted from the source node. In response to a variation in the tilt of the network utility of the source node according to an amount of packets transmitted from the source node, the source node estimates a network utility of each of the plurality of relay candidate nodes according to Equation 13, and extracts, with respect to each of the plurality of relay candidate nodes, a tilt of the network utility of each of the plurality of relay candidate nodes according to an amount of packets transmitted from each of the plurality of relay candidate nodes. The source node may determine a node having a largest tilt as a relay node by comparing the extracted tilts of network utilities of nodes. Also, every time the tilt of the network utility of the relay node according to an amount of packets transmitted from the relay node varies, the source node may update the second utility of each of the plurality of relay candidate nodes, and may select, from the plurality of relay candidate nodes as the relay node, a relay candidate node having a largest tilt of the second utility according to an amount of packets transmitted from the relay candidate node. In an example, when a tilt of a network utility of a relay node according to an amount of packets transmitted from the relay node varies, the source node may determine whether a relay candidate node to be added is present. When the relay candidate node to be added is present, the source node may estimate a network utility of the relay candidate node to be added, and may extract a tilt of the network utility of the relay candidate node to be added according to an amount of packets transmitted from the relay candidate node to be added. Also, in an example, when selecting the relay node, the source node may determine a packet transmission amount of the selected relay node until the tilt of the network utility of the relay node according to an amount of packets transmitted from the relay node varies.

In operation 950, the source node determines whether a total packet transmission amount of the relay node is less than or equal to a predetermined maximum packet transmission amount. In an example, the predetermined maximum packet transmission amount may be set based on a throughput measured by the relay node. When the total packet transmission amount of the relay node is greater than the predetermined maximum packet transmission amount, the source node continues in operation 951. When the total packet transmission amount of the relay node is less than or equal to the predetermined maximum packet transmission amount, the source node continues in operation 960.

In operation 951, the source node corrects the packet transmission amount of the relay node to be less than or equal to the predetermined maximum packet transmission amount.

In operation 960, the source node determines whether the remaining nodes have completed the packet reception. When the remaining nodes have not completed the packet reception, the source node repeats operations 940 through 960. Conversely, when the remaining nodes have completed the packet reception, the source node enters into an idle state.

Figure 10:
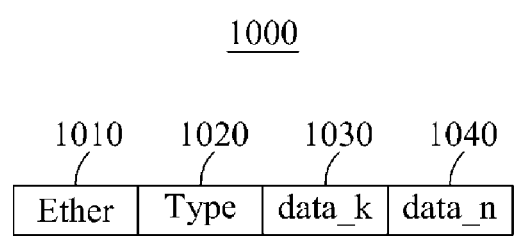
FIG. 10 is a diagram illustrating an example of a format of a relay selection packet.

FIG. 10 illustrates an example of a format of a relay selection packet 1000. Referring to FIG. 10, when a source node selects a relay node from a plurality of relay candidate nodes and determines a packet transmission amount of the selected relay node, the source node transmits the relay selection packet 1000 to the relay node.

Referring to FIG. 10, the relay selection packet 1000 includes an Ethernet (Ether) header 1010, a type field 1020, an original packet (data_k) field 1030, and an encoding packet (data_n) field 1040. The Ethernet header 1010 indicates an Ethernet type of the relay selection packet 1000, and the type field 1020 indicates an attribute of the relay selection packet 1000. For example, a field value of the type field 1020 may be "8". The original packet field 1030 indicates the number of original packets to be converted to an encoded packet. The encoding packet field 1040 indicates the number of encoded packets to be converted.

Hereinafter, an encoding and decoding method using a matrix network coding (MNC) will be described.

Figure 11:
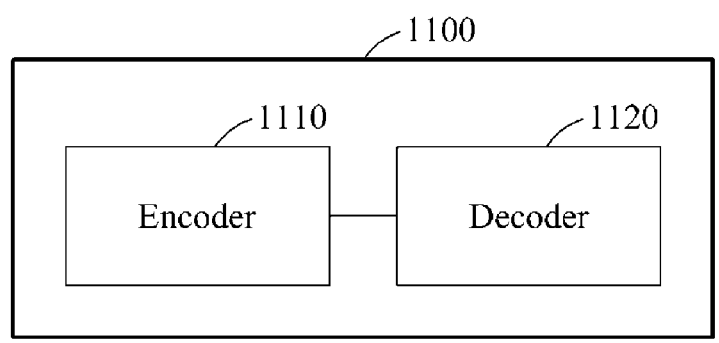
FIG. 11 is a diagram illustrating an example of a node.

FIG. 11 illustrates an example of a node 1100. Referring to FIG. 11, the node 1100 includes an encoder 1110 and a decoder 1120. The encoder 1110 receives an original packet from an Ethernet module, divides the original packet into a plurality of sub-packets, and generates encoded data by performing an operation on the plurality of sub-packets and a random matrix. In an example, the encoder 1110 may add, to encoded data, a first header including information of the encoded data. The first header includes at least one of information of the number of original packets, information of a length of a random matrix, information of an identifier of the encoded packet, information of a coefficient of the random matrix, and information of a type of the encoded packet. Information of the type of the encoded packet includes a systematic code and a nonsystematic code. The systematic code refers to a code to transmit an original packet to a WLAN module prior to transmitting an encoded packet to the WLAN module. The nonsystematic code refers to a code to transmit only the encoded packet to the WLAN module. Also, the encoder 1110 may add, to the encoded packet, a second header including information of an Ethernet type of the original packet.

In an example, the encoder 1110 may convert K original packets to N encoded packets using MNC (N≥K). For example, the encoder 1110 may convert the K original packets received from the Ethernet module to the N encoded packets using K random matrices, and may transmit the N encoded packets to the WLAN module. The node 1100 transmits the N encoded packets to another node. In an example, when a node configured to receive an encoded packet receives K or more encoded packets among the N encoded packets, a probability that the node acquires the K original packets may increase, which may lead to increasing reliability. Also, according to an increase in the number of encoded packets transmitted from the node 1100, overhead in nodes transmitting and receiving encoded packets may also increase. Accordingly, the node 1100 may adjust the reliability and overhead of nodes transmitting and receiving encoded packets by adjusting a ratio between K denoting the number of original packets and N denoting the number of encoded packets.

The decoder 1120 converts an encoded packet to an original packet based on a generator matrix that is generated based on the encoded packet received from another node. In an example, the decoder 1120 may generate the generator matrix by extracting a matrix coefficient from the received encoded packet. For example, when K encoded packets are received, the decoder 1120 may generate a pK×pK generator matrix by extracting a matrix coefficient from the K encoded packets. In this example, p denotes a length of each of a plurality of sub-packets divided from the original packet by the encoder 1110. The decoder 1120 extracts the original packet by extracting an inverse matrix of the generator matrix, and by multiplying the encoded packet and the inverse matrix of the generator matrix. Here, the decoder 1120 may employ an LU decomposition method. Accordingly, a decoding rate of the decoder 1120 may be improved.

Figure 12:
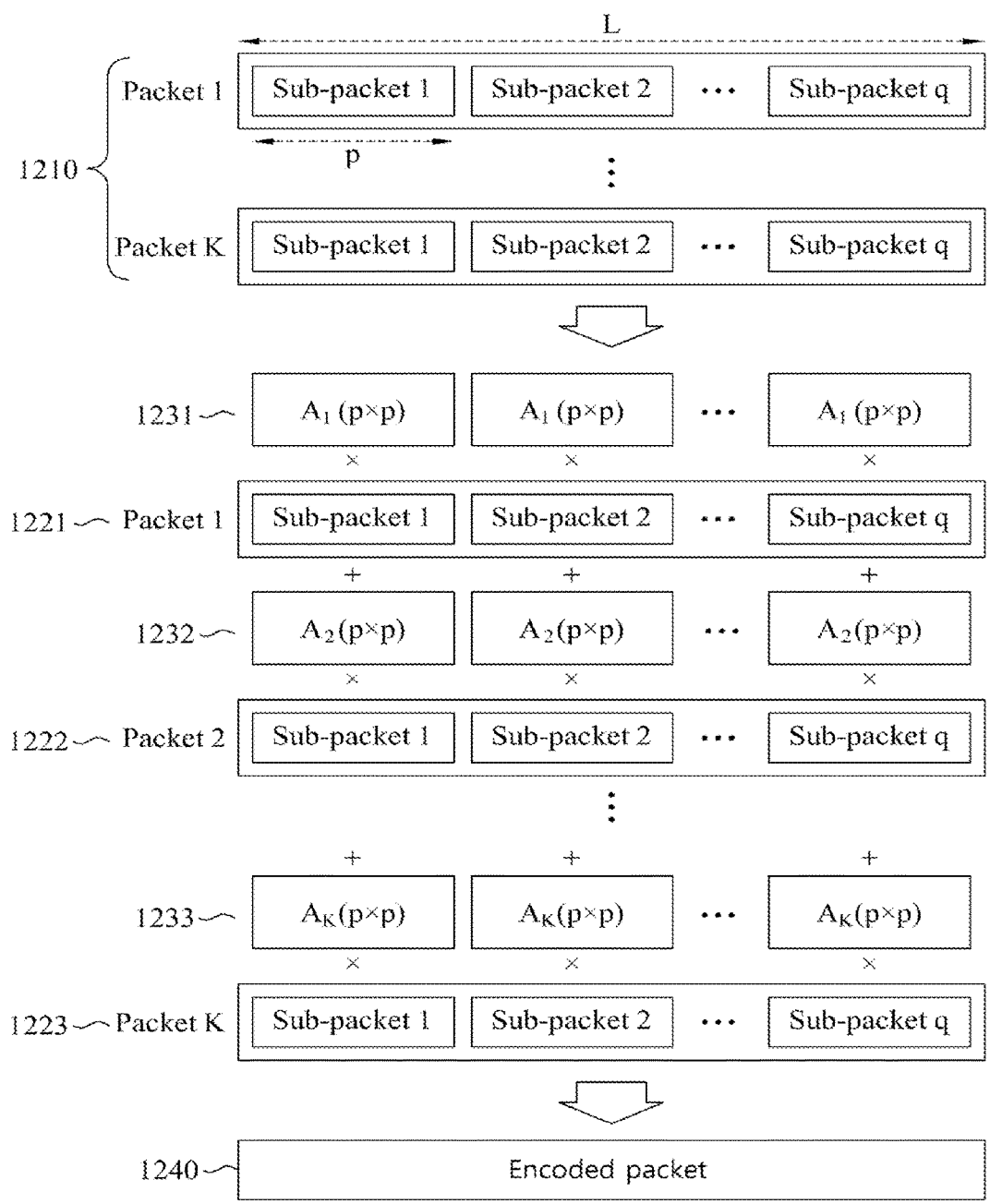
FIG. 12 is a diagram describing an example of an encoding method.

FIG. 12 illustrates an example of an encoding method. An operation of a node to be described with reference to FIGS. 12 and 13 may refer to an operation of the encoder 1110 of FIG. 11.

Referring to FIG. 12, a node divides each of K original packets 1210 into q sub-packets to encode the K original packets 1210. Each of the K original packets 1210 has an L-symbol length, and each of the q sub-packets has a p-symbol length. The node generates K random matrices $A_1$ through $A_K$, each having a size of "p×p", selects a random matrix based on indices of the K original packets 1210, and multiplies sub-packets of an original packet having a corresponding index by the selected random matrix. For example, the node multiplies sub-packets of a first packet 1221 by a first random matrix $A_1$ 1231, multiplies sub-packets of a second packet 1222 by a second random matrix $A_2$ 1232, and multiplies sub-packets of a K-th packet 1223 by a K-th random matrix $A_K$ 1233. The node generates a single encoded packet 1240 by adding up the respective sub-packets multiplied by the corresponding random matrices. In an example, a symbol and an operation of FIG. 12 are assumed to be defined in a Galois field. The node may generate N encoded packets by repeating the aforementioned process N times.

Figure 13:
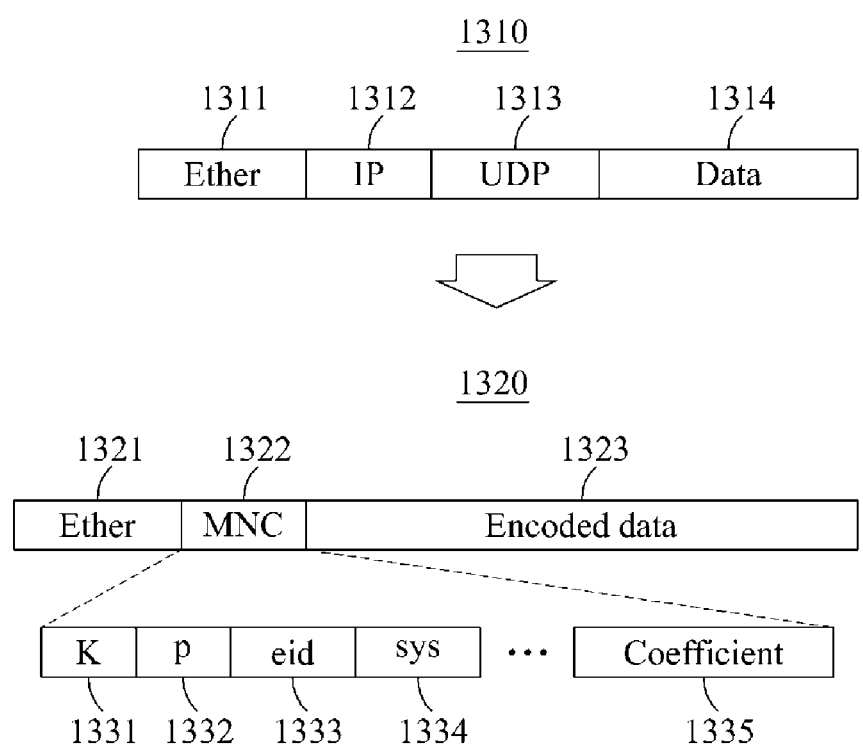
FIG. 13 is a diagram illustrating an example of a format of an encoded packet.

FIG. 13 illustrates an example of an encoded packet 1320. Referring to FIG. 13, an original packet 1310 includes an Ethernet (Ether) header 1311, an IP field 1312, a user datagram protocol (UDP) field 1313, and a data field 1314. The Ethernet header 1311 denotes an Ethernet type of the original packet 1310. A node may perform encoding on the IP field 1312, the UDP field 1313, and the data field 1314.

The encoded packet 1320 includes an Ethernet (Ether) header 1321, an MNC header 1322, and an encoded data field 1323. The encoded data field 1323 corresponds to a converted portion of the IP field 1312, the UDP field 1313, and the data field 1314 of the original packet 1310. The Ethernet header 1321 denotes an Ethernet type of the encoded packet 1320. The MNC header 1322 includes a K field 1331, a p field 1332, an eid field 1333, a sys field 1334, and a coefficient field 1335.

The K field 1331 denotes the number of original packets, and the p field 1332 denotes a length of a random matrix to be multiplied by sub-packets of the original packet 1310. The eid field 1333 denotes an identifier of the encoded packet 1320. For example, a node may identify each of encoded packets by incrementing a value of the eid field 1333 by each one every time encoding is performed. Information of a type of the encoded packet 1320 includes a systematic code and a nonsystematic code. The systematic code refers to a code to transmit an original packet to a WLAN module of the node prior to transmitting an encoded packet to the WLAN module of the node. The nonsystematic code refers to a code to transmit only the encoded packet to the WLAN module of the node. The coefficient field 1335 refers to an element of a finite field. The node may perform encoding and decoding using a finite field operation. A size of the coefficient field 1335 is in proportion to a size of the infinite field used for encoding, a size of a random matrix, and the number of original packets. The size of the coefficient field 1335 is expressed by Equation 14.

$$\log_2|\text{finite\_field\_size}| \times p^2 \times K \qquad [\text{Equation 14}]$$

In Equation 14, |finite_field_size| denotes the size of the finite field used for encoding, p denotes the length of the random matrix, and K denotes the number of original packets. In an example, the node may reduce the size of the MNC header 1322 using a predetermined processing method.

In an example, when an original packet is acquired, the node may store the original packet in a packet queue. When K original packets are stored in the packet queue, the node may perform encoding. When the encoded packet follows a systematic code, the node adds the MNC header to each of K original packets, generates (N−K) encoded packets, and adds the MNC header to each encoded packet. Also, when the encoded packet follows the nonsystematic code, the node generates N encoded packets, and adds the MNC header to each encoded packet. In an example, when the node does not acquire K original packets during a predetermined period of time, the node may encode only stored packets to prevent encoding latency from being prolonged.

Figure 14:
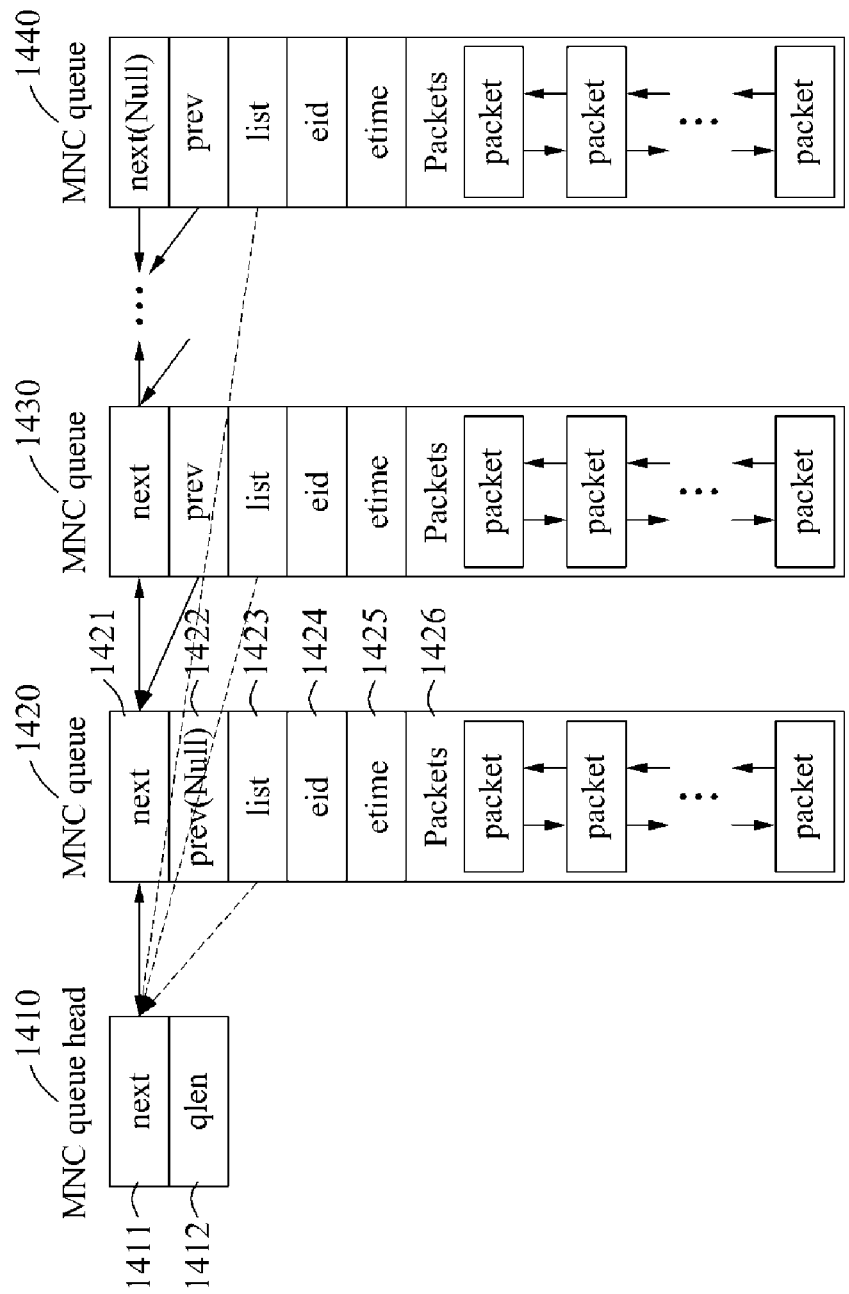
FIG. 14 is a diagram describing an example of a decoding method.

FIG. 14 illustrates an example of a decoding method. An operation of a node to be described with reference to FIG. 14 may refer to an operation of the decoder 1120 of FIG. 11.

Referring to FIG. 14, the node decodes an encoded packet using a packet queue list. The packet queue list includes a packet queue head 1410 and a plurality of packet queues, for example, a first packet queue 1420, a second packet queue 1430, and a third packet queue 1440. The packet queue head 1410 and the plurality of packet queues, for example, the first through third packet queues 1420, 1430, and 1440, may be configured in a linked list form. The packet queue head 1410 denotes an initial pointer of the packet queue list. The packet queue head 1410 includes next data 1411 and glen data 1412. The next data 1411 denotes an address value of the first packet queue 1420, and the glen data 1412 denotes the number of packet queues. The first packet queue 1420 includes next data 1421, prev data 1422, list data 1423, eid data 1424, etime data 1425, and packet data 1426. The next data 1421 denotes an address value of the second packet queue 1430, and the prev data 1422 denotes an address value of a previous packet queue. The first packet queue 1420 does not have a previous packet queue, and thus, the prev data 1422 is null. The list data 1423 denotes the next data 1411 of the packet queue head 1410, and the packet data 1426 includes a packet inserted, for example, enqueued in the first packet queue 1420. The packet data 1426 may include a non-encoded packet and an encoded packet. The etime data 1425 denotes a time at which a last packet is inserted in the first packet queue 1420, and the eid data 1424 denotes an identifier of a packet inserted in the packet queue 1420. Accordingly, packets inserted in a single packet queue may have the same identifier.

In an example, when a packet is received from another node, a node may insert the packet in a packet queue included in a packet queue list. When a time at which the packet is inserted in the packet queue is ahead of a predetermined threshold time through a comparison therebetween, the node may delete the corresponding packet queue from the packet queue list. Also, when an identifier of the packet is identical to an identifier of an encoded packet converted to an original packet during a predetermined period of time, the node may not insert the packet in the packet queue. Conversely, when the identifier of the packet differs from the identifier of the encoded packet converted to the original packet during the predetermined period of time, the node may insert the packet in the packet queue and may update etime data of the packet queue.

In an example, when K packets are inserted in a packet queue, a node may determine whether a packet inserted in the packet queue is not encoded or encoded. When all the packets inserted in the packet queue are not encoded, the node may not perform separate decoding, and instead, may extract only an original packet by removing only a field inserted in the original packet from the non-encoded packets. When even a single encoded packet is present among packets inserted in the packet queue, the node may perform decoding using a generator matrix. In this example, the node may extract the original packet by generating the generator matrix, by extracting an inverse of the generator matrix, and by multiplying an encoded packet by the inverse matrix of the generator matrix. In an example in which a component corresponding to a predetermined packet is linearly dependent, the node may not extract an inverse matrix of a generator matrix. In this example, the node may delete an encoded packet corresponding to the linearly dependent component from a packet queue.

Hereinafter, an operation method of a node in a multicast network will be described.

Figure 15:
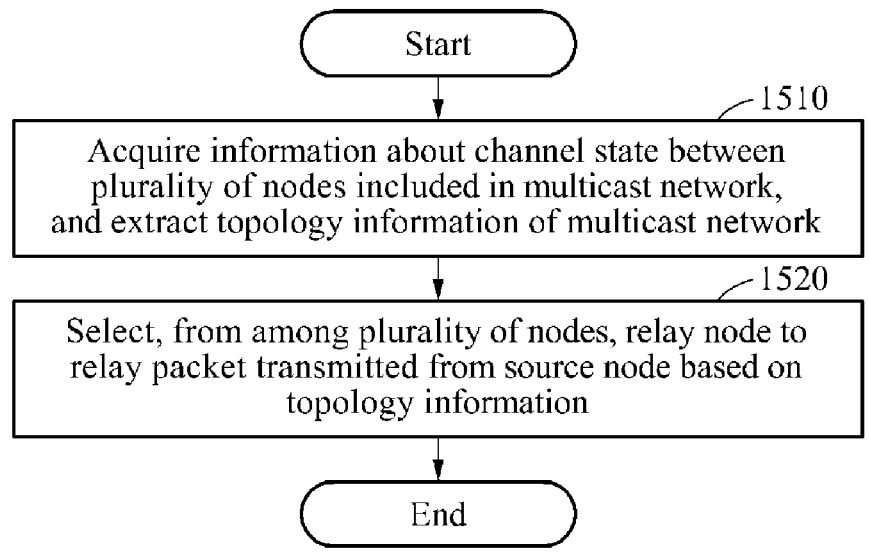
FIG. 15 is a flowchart illustrating an example of an operation method of a source node.

FIG. 15 is a flowchart illustrating an example of an operation method of a source node. Referring to FIG. 15, in operation 1510, the source node acquires information about a channel state between a plurality of nodes included in a multicast network, and extracts topology information of the multicast network from the information of the channel state.

In operation 1520, the source node selects, from among the plurality of nodes, a relay node to relay a packet transmitted from the source node based on the topology information.

Description made above with reference to FIGS. 1 through 14 may be applicable to the operation method of the source node of FIG. 15, and thus, a further detailed description will be omitted.

Figure 16:
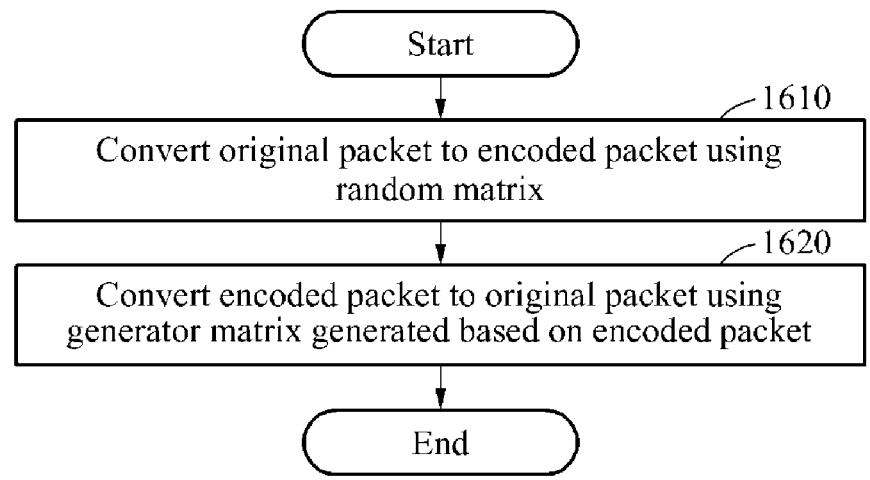
FIG. 16 is a flowchart illustrating an example of an operation method of a node.

FIG. 16 is a flowchart illustrating an example of an operation method of a node. Referring to FIG. 16, in operation 1610, the node converts an original packet to an encoded packet using a random matrix.

In operation 1620, the node converts the encoded packet to the original packet using a generator matrix generated based on the encoded packet.

Description made above with reference to FIGS. 1 through 14 may be applicable to the operation method of the node of FIG. 16, and thus, a further detailed description will be omitted.

Figure 17:
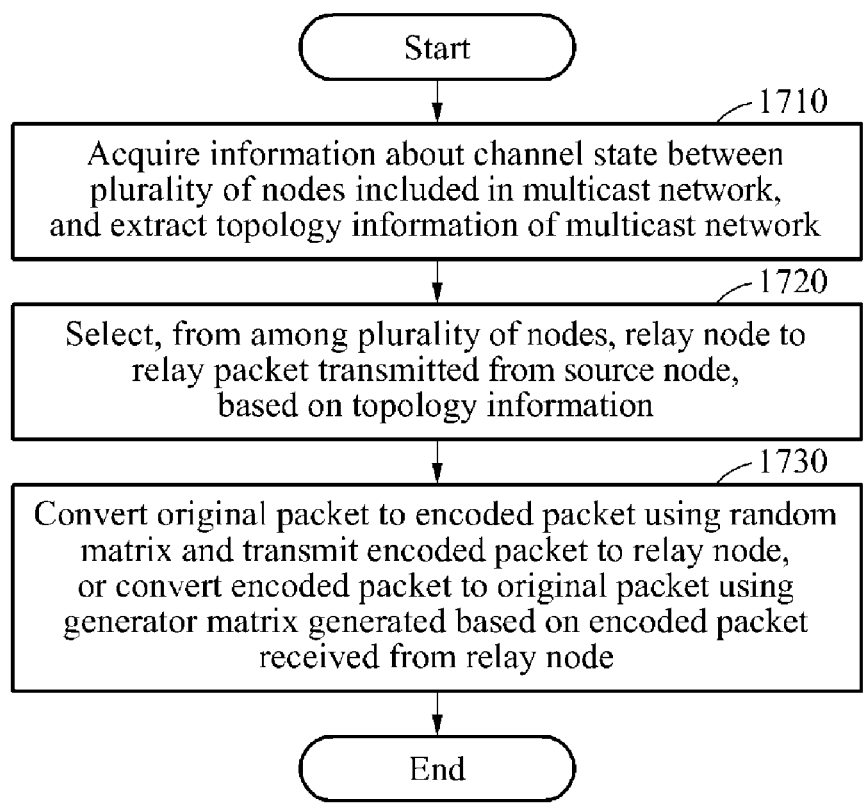
FIG. 17 is a flowchart illustrating another example of an operation method of a source node.

FIG. 17 is a flowchart illustrating another example of an operation method of a source node. Referring to FIG. 17, in operation 1710, the source node acquires information about a channel state between a plurality of nodes included in a multicast network, and extracts topology information of the multicast network from the information of the channel state.

In operation 1720, the source node selects, from among the plurality of nodes, a relay node to relay a packet transmitted from the source node, based on the topology information.

In operation 1730, the source node converts an original packet to an encoded packet using a random matrix and transmits the encoded packet to the relay node, or converts the encoded packet to the original packet using a generator matrix generated based on the encoded packet received from the relay node.

Description made above with reference to FIGS. 1 through 14 may be applicable to the operation method of the source node of FIG. 17, and thus, a further detailed description will be omitted.

The units, modules, elements, and methods described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM, random-access memory (RAM, CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A source node, comprising:
one or more processors configured to:
acquire information of a channel state between nodes comprised in a multicast network, and extract topology information of the multicast network;
estimate a predicted packet reception amount of each of the remaining nodes excluding the source node, among the nodes, based on the topology information, wherein the predicted packet reception amount indicates a packet reception amount that causes a probability that each of the remaining nodes receives packets corresponding to a target packet reception amount or more to be greater than or equal to a predetermined threshold probability;
estimate a potentially required degree of freedom (PR-DoF) of each of the remaining nodes based on the predicted packet reception amount, the PR-DoF indicating the amount of packets to be additionally received by each of the remaining nodes after receiving the packet from another node; and
select, from the nodes, a relay node to relay a packet transmitted from the source node, based on the predicted packet reception amount and the PR-DoF.

2. The source node of claim 1, wherein the one or more processors, comprise:
a topology information extractor configured to acquire the information of the channel state between nodes comprised in the multicast network, and extract the topology information of the multicast network; and
a relay node selector configured to:
estimate the predicted packet reception amount of each of the remaining nodes excluding the source node, among the nodes, based on the topology information;
estimate the potentially required degree of freedom (PR-DoF) of each of the remaining nodes based on the predicted packet reception amount; and
select, from the nodes, the relay node to relay a packet transmitted from the source node, based on the predicted packet reception amount and the PR-DoF.

3. The source node of claim 2, wherein the topology information extractor is configured to extract the topology information based on packets received by the remaining nodes.

4. The source node of claim 2, wherein the topology information extractor is configured to:
transmit training packets to a first node among the remaining nodes; and
receive, from the first node as feedback, a training report packet comprising information of the training packets received by the first node.

5. The source node of claim 4, wherein the topology information extractor is configured to:
calculate a packet reception rate of the first node based on the training report packet; and
select the first node as a relay candidate node in response to the packet reception rate being greater than or equal to a predetermined threshold level.

6. The source node of claim 2, wherein the topology information extractor is configured to:
transmit, to a relay candidate node selected from the remaining nodes a training polling packet to cause the relay candidate node to transmit training packets to a second node among the remaining nodes.

7. The source node of claim 6, wherein in response to relay candidate nodes being present among the remaining nodes, the topology information extractor is configured to:
transmit the training polling packet to the relay candidate nodes in a predetermined order.

8. The source node of claim 6, wherein the topology information extractor is configured to:
receive, from the relay candidate node, a neighbor report packet comprising information of the second node and information of the training packets received by the second node.

9. The source node of claim 6, wherein the topology information extractor is configured to:
receive, from the relay candidate node, a block training report packet comprising information of nodes that transmitted the training packets to a portion of the remaining nodes, information of the portion of the remaining nodes, and information of the training packets received by the portion of the remaining nodes.

10. The source node of claim 2, wherein the topology information extractor is configured to:
select, as training nodes, a portion of the remaining nodes; and
extract the topology information based on information of packets received by the selected training nodes.

11. The source node of claim 2, wherein the topology information extractor is configured to:
receive statistical information of the channel state between the nodes from the remaining nodes; and
extract the topology information based on the statistical information.

12. The source node of claim 2, wherein the relay node selector is configured to:
classify the remaining nodes into a 1-hop node group and a 2-hop node group based on the topology information; and
select the relay node from relay candidate nodes, among the remaining nodes, based on an effect of packet transmission from the relay candidate nodes with respect to at least a portion of the remaining nodes.

13. The source node of claim 12, wherein the relay node selector is configured to:
estimate the predicted packet reception amount of each of the remaining nodes based on the topology information;
determine, to be in the 1-hop node group, a node having a relatively low PR-DoF, among the remaining nodes; and determine, to be in the 2-hop node group, a node having a relatively high PR-DoF, among the remaining nodes.

14. The source node of claim 13, wherein the relay node selector is configured to:
calculate a number of required transmissions (RTX) of each of at least one node comprised in the 2-hop node group, based on the PR-DoF of each of the at least one node with respect to each of the relay candidate nodes, the RTX indicating an amount of packets that is requested to be transmitted by each of the at least one node with respect to each of the relay candidate nodes; and
select the relay node from the relay candidate nodes based on the RTX.

15. The source node of claim 14, wherein the relay node selector is configured to:
estimate a minimum RTX among the RTX of each of the at least one node comprised in the 2-hop node group;
extract, from the at least one node with respect to each of the relay candidate nodes, a best two-hop node group (BTG) comprising nodes that request a corresponding relay candidate node to transmit a packet thereto at the minimum RTX;
estimate, with respect to each of the relay candidate nodes, a maximum RTX among minimum RTXs of the nodes comprised in the BTG; and
estimate, with respect to each of the relay candidate nodes, a first utility indicating an effect of packet transmission to the nodes comprised in the BTG according to the maximum RTX with respect to at least a portion of the remaining nodes.

16. The source node of claim 15, wherein the relay node selector is configured to:
select, as the relay node, a relay candidate node having a largest first utility from the relay candidate nodes.

17. The source node of claim 15, wherein the relay node selector is configured to:
select, as the relay node, a relay candidate node having a largest maximum RTX from the relay candidate nodes.

18. The source node of claim 15, wherein in response to a total packet transmission rate of the selected relay node being less than a predetermined maximum packet transmission amount, the relay node selector is configured to:
select the relay node from the relay candidate nodes by updating the PR-DoF, the RTX, the minimum RTX, the maximum RTX, and the first utility, based on the selected relay node.

19. The source node of claim 15, wherein the relay node selector is configured to:
estimate, with respect to each of the at least one node comprised in the 2-hop node group, a second utility indicating a satisfaction level of a node comprised in the 2-hop node group according to packet transmission from each of the relay candidate nodes to the node comprised in the 2-hop node group;
estimate, with respect to each of the relay candidate nodes, a network utility indicating a satisfaction level of the 2-hop node group according to the packet transmission from each of the relay candidate nodes, based on the second utility of each of the at least one node; and
select the relay node from the relay candidate nodes based on the network utility of each of the relay candidate nodes.

20. The source node of claim 19, wherein the relay node selector is configured to:
select, from the relay candidate nodes as the relay node, a relay candidate node having a largest tilt of the second utility according to an amount of packets transmitted from one of the relay candidate nodes by updating the second utility of each of the relay candidate nodes in response to a tilt of the network utility according to an amount of packets transmitted from the relay candidate node.

21. An operation method of a source node, the method comprising:
acquiring information of a channel state between nodes comprised in a multicast network;
extracting topology information of the multicast network;
estimating a predicted packet reception amount of each of the remaining nodes excluding the source node, among the nodes, based on the topology information, wherein the predicted packet reception amount indicates a packet reception amount that causes a probability that each of the remaining nodes receives packet corresponding to a target packet reception amount or more to be greater than or equal to a predetermined threshold probability;
estimate a potentially required degree of freedom (PR-DoF) of each of the remaining nodes based on the predicted packet reception amount, the PR-DoF indicating the amount of packets to be additionally received by each of the remaining nodes after receiving the packet from another node; and
selecting, from the nodes, a relay node to relay a packet transmitted from the source node, based on the predicted packet reception amount and the PR-DoF.

22. A non-transitory computer-readable storage medium storing a program comprising instructions to cause a computer to perform the method of claim 21.

* * * * *